United States Patent [19]

Tague et al.

[11] 4,426,680

[45] Jan. 17, 1984

[54] DATA PROCESSOR USING READ ONLY MEMORIES FOR OPTIMIZING MAIN MEMORY ACCESS AND IDENTIFYING THE STARTING POSITION OF AN OPERAND

[75] Inventors: Steven A. Tague, Billerica; Virendra S. Negi, Pepperell, both of Mass.

[73] Assignees: Honeywell Information Systems Inc., Waltham, Mass.

[21] Appl. No.: 219,809

[22] Filed: Dec. 24, 1980

[51] Int. Cl.³ .............................................. G06F 7/38
[52] U.S. Cl. ................................................... 364/200
[58] Field of Search .............. 364/200, 900, 736, 755, 364/756, 762, 763, 778

[56] References Cited

U.S. PATENT DOCUMENTS

| | | | |
|---|---|---|---|
| 3,787,673 | 1/1974 | Watson et al. | 364/736 |
| 4,125,867 | 11/1978 | Cochran | 364/781 |
| 4,203,157 | 5/1980 | Daniels et al. | 364/788 |
| 4,276,596 | 6/1981 | Flynn et al. | 364/778 |

*Primary Examiner*—James D. Thomas
*Assistant Examiner*—David Y. Eng
*Attorney, Agent, or Firm*—George Grayson; Nicholas Prasinos; George Grayson

[57] ABSTRACT

A data processing system which includes a commercial instruction processor for executing decimal alphanumeric instructions uses read only memories in the alignment of the operands. The characteristics of the operands, string or packed decimal, as well as the length and position of the most significant decimal digit in a main memory word, are specified by data descriptors. The read only memories are responsive to the data descriptor information as well as the instruction being executed to generate signals which specify whether the direction words are read from main memory, high order word first or low order word first, the number of double words in the operand and the location of the least or most significant decimal digit within the word as stored in registers of the commercial instruction processor.

10 Claims, 11 Drawing Figures

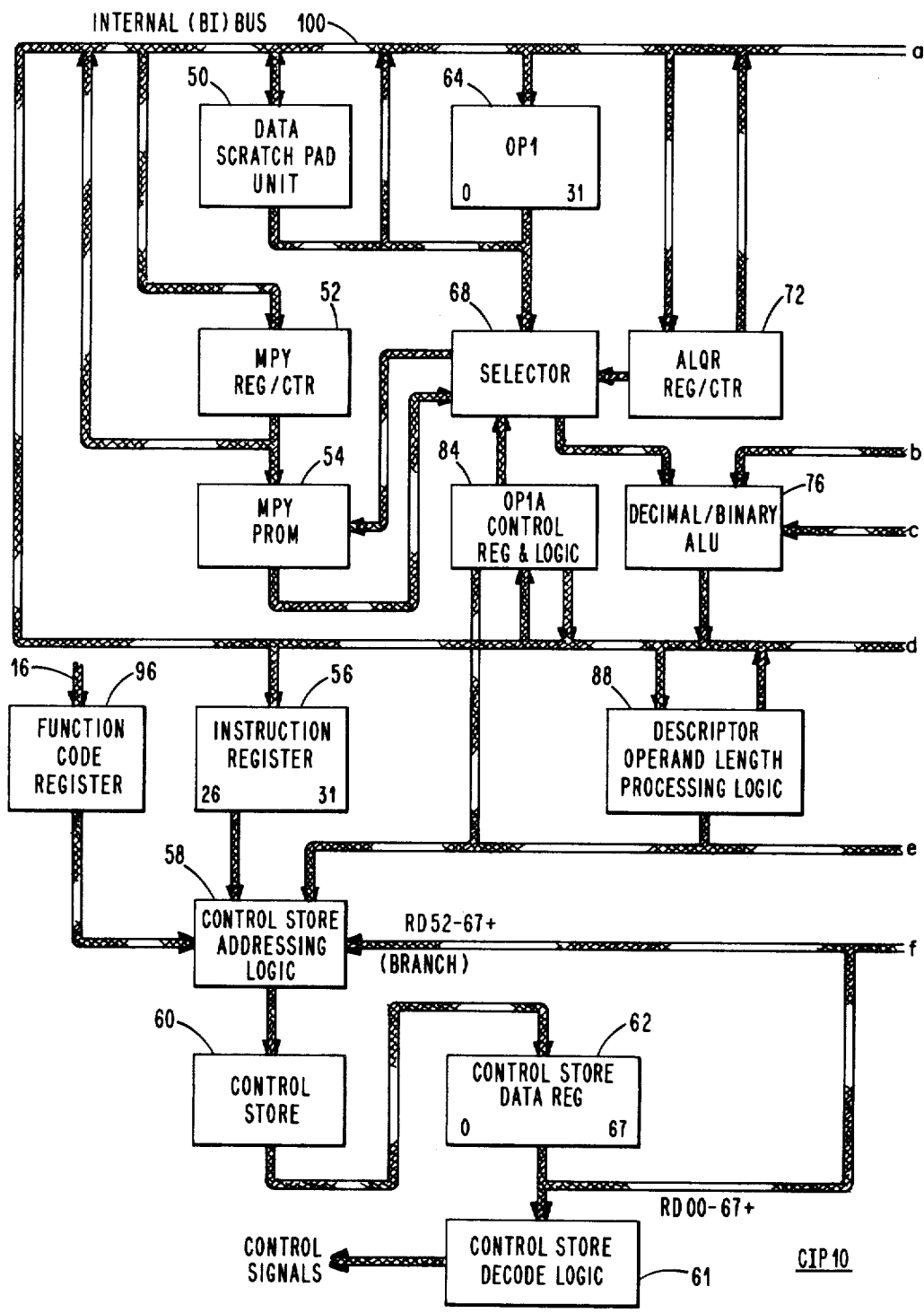
Fig. 2. (sheet 1 of 2)

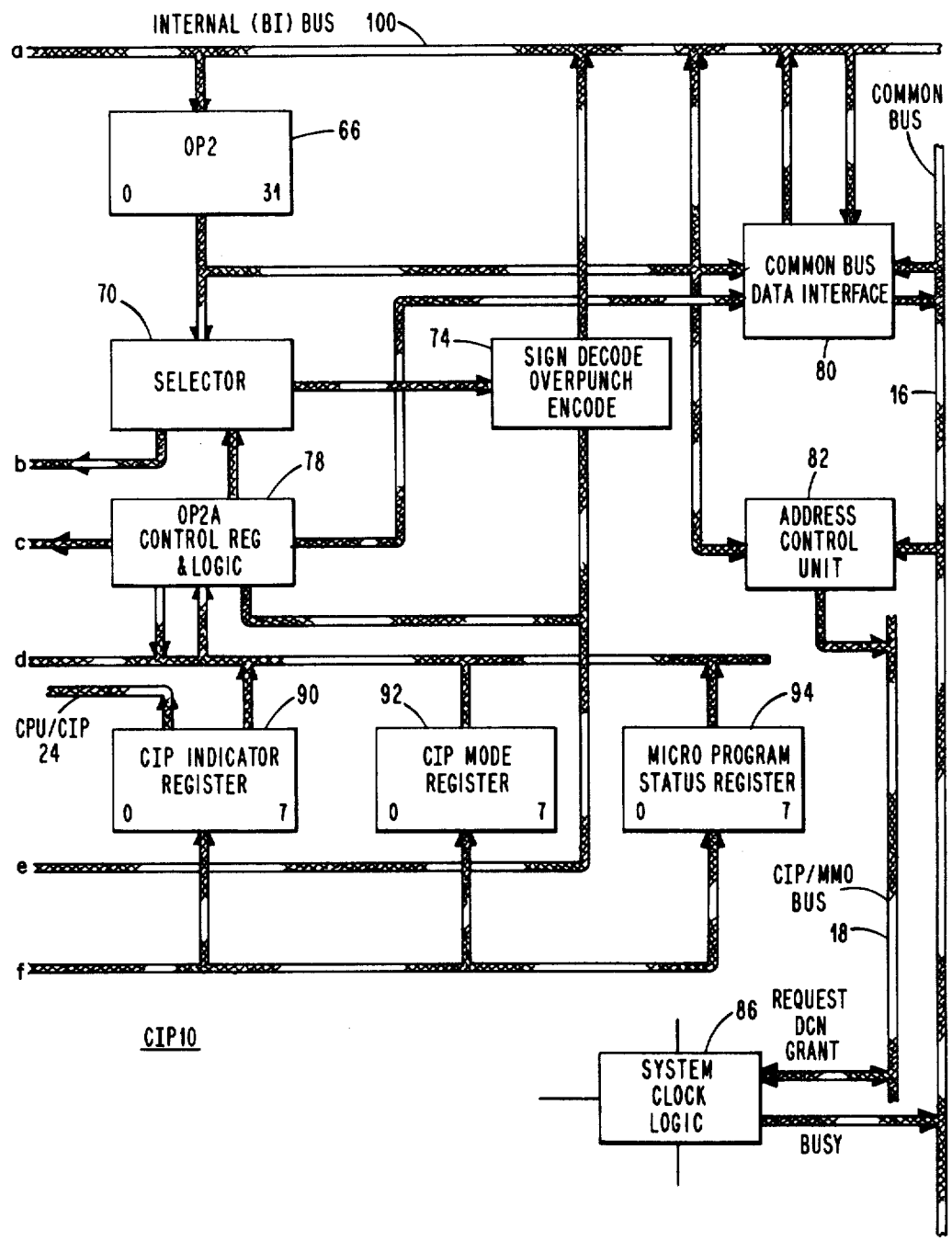
Fig. 2. (sheet 2 of 2)

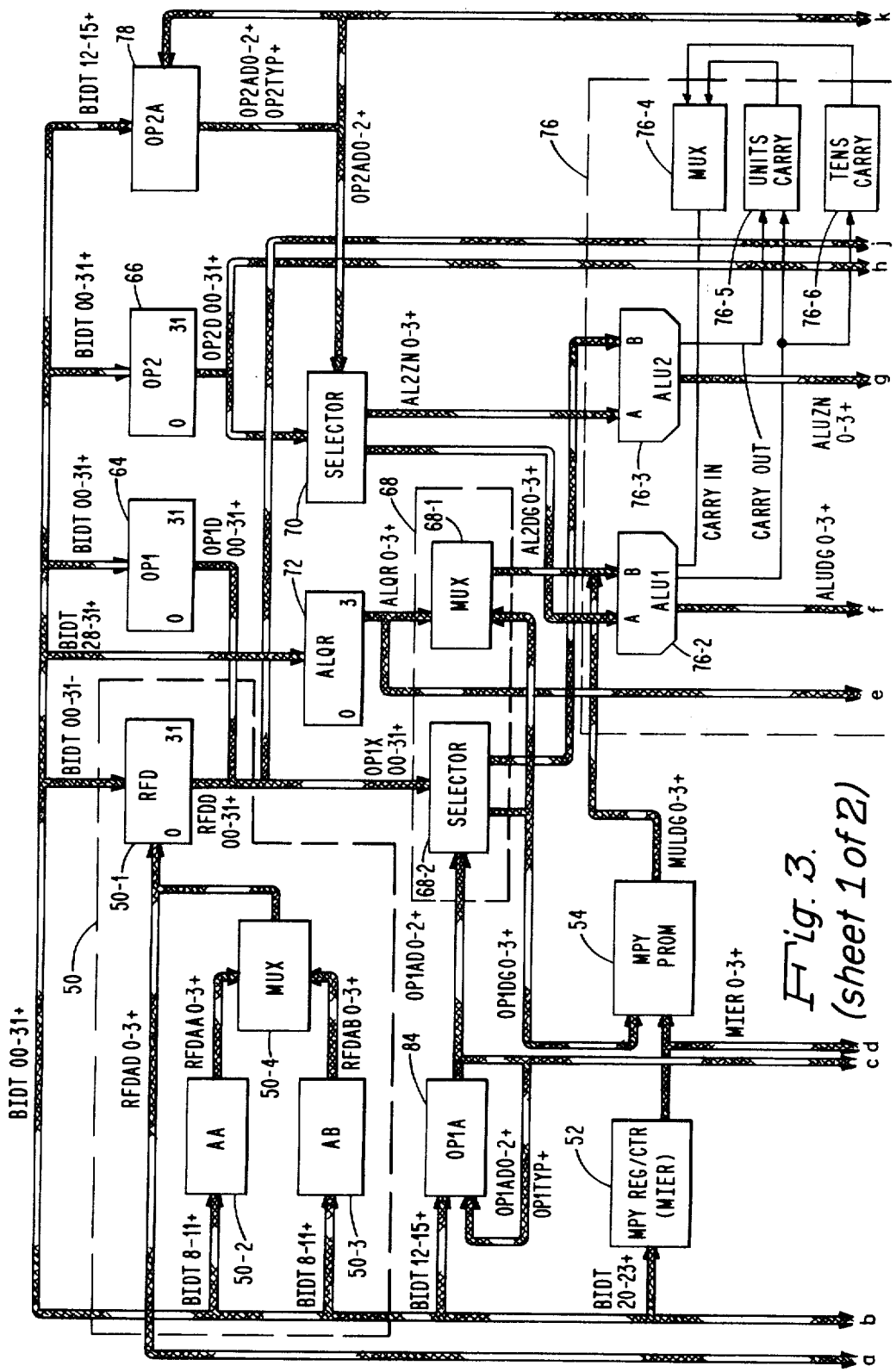

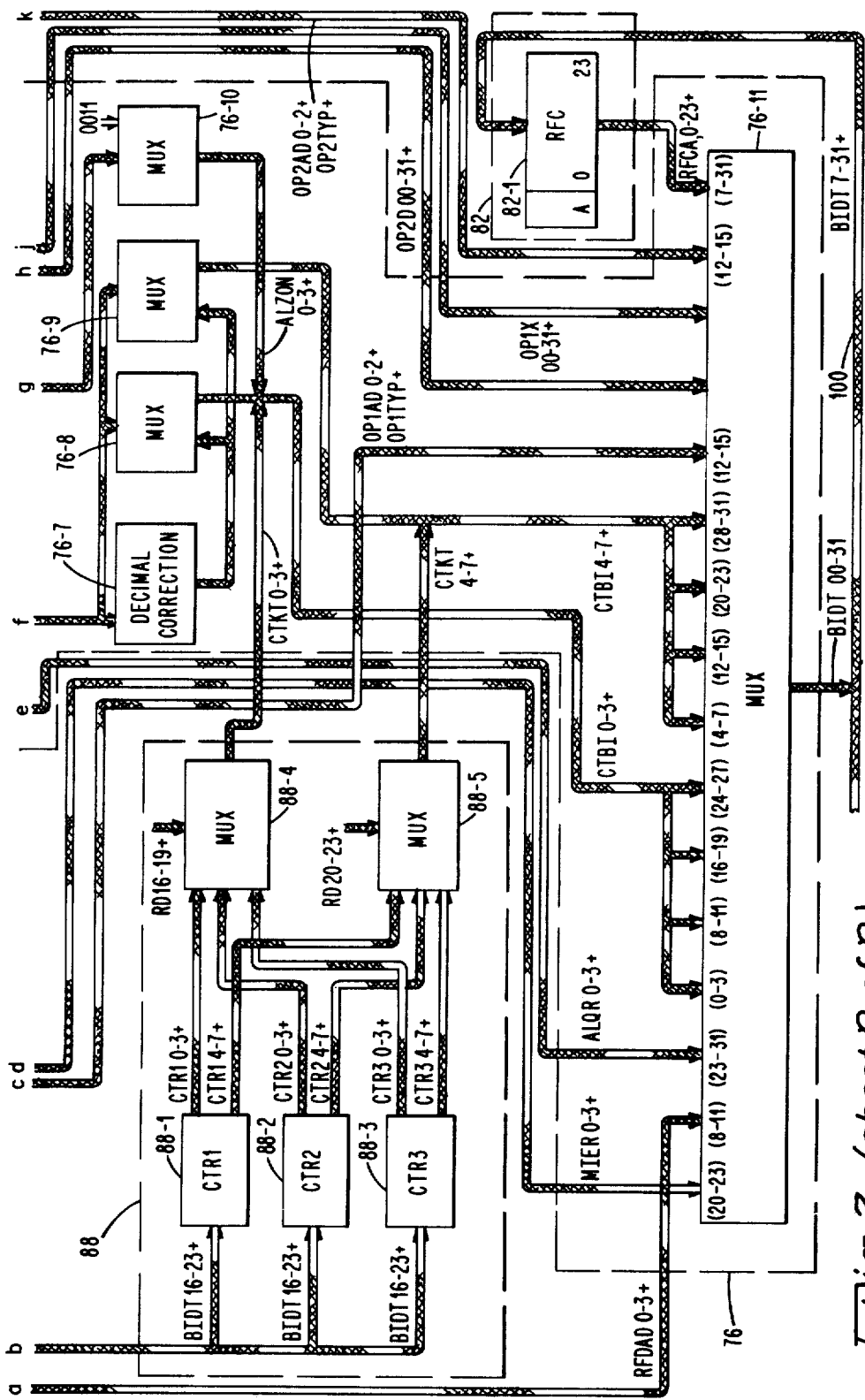
Fig. 3. (sheet 2 of 2)

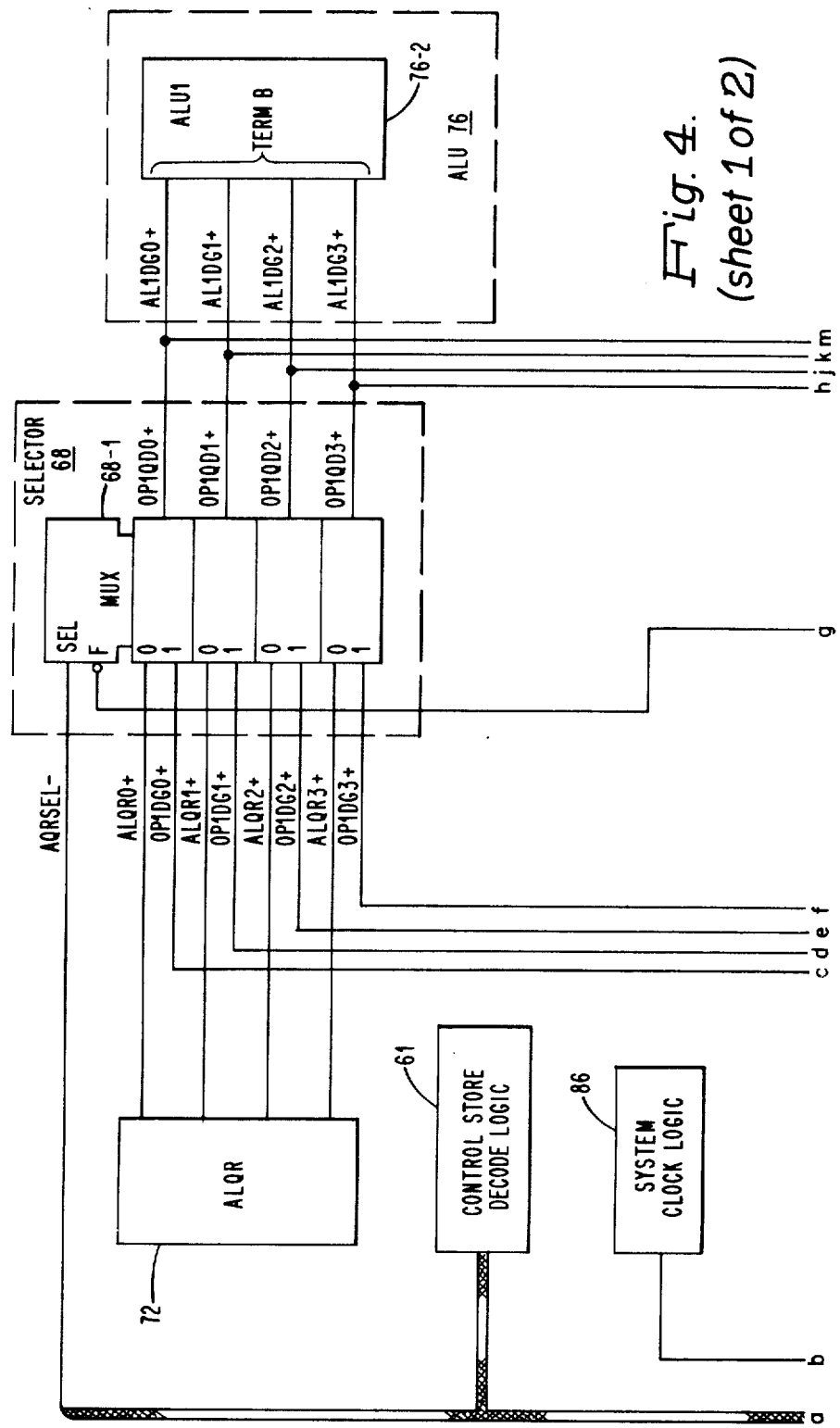
Fig. 4. (sheet 1 of 2)

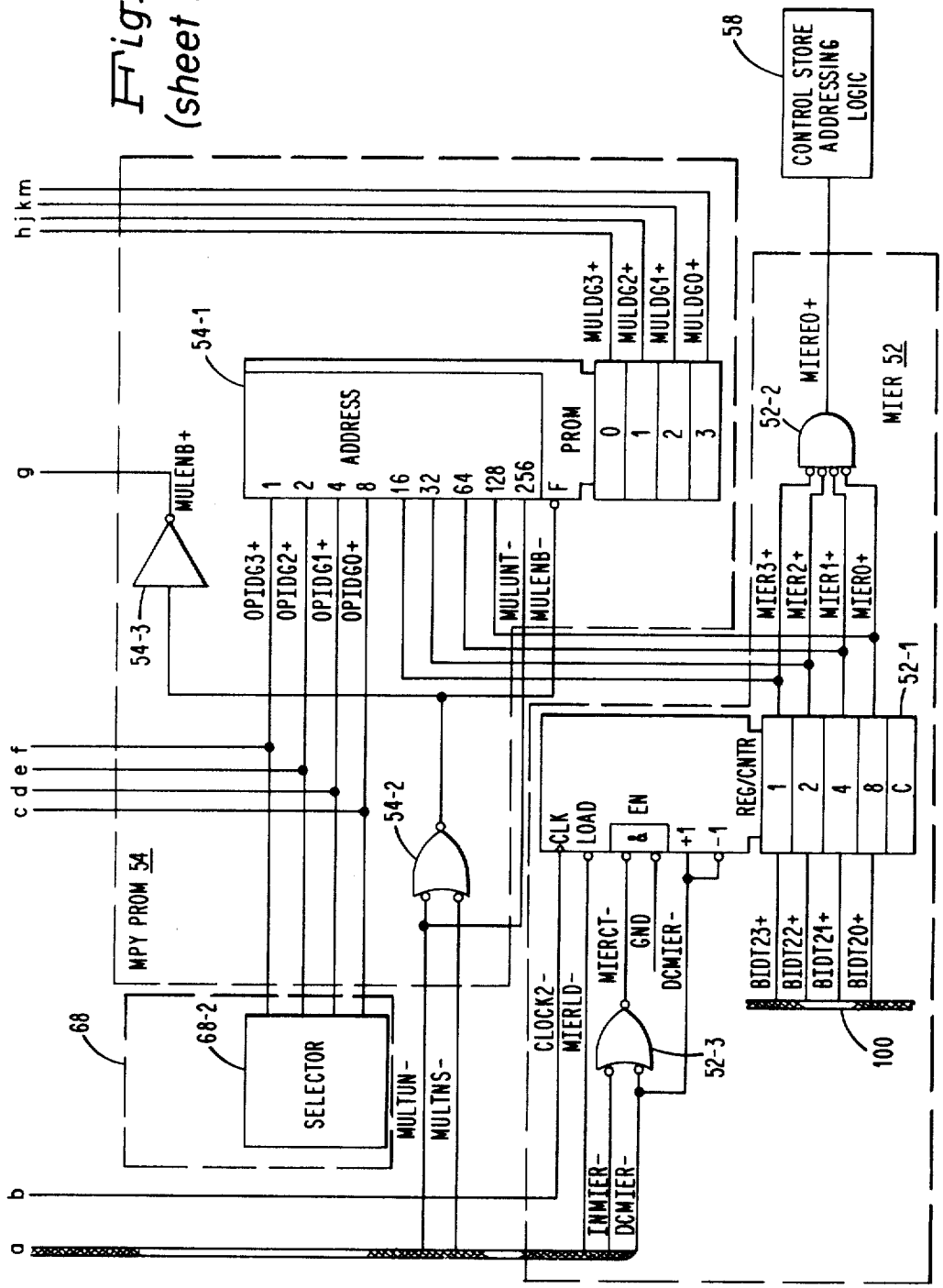
Fig. 4. (sheet 2 of 2)

OPERAND 1 - MULTIPLIER - PACKED DECIMAL, TRAILING SIGN

|  |  | (+) |  |
|---|---|---|---|
| X X | X 7 | 8 B | X X |

MAIN MEMORY 4
BYTE ADDRESS LOCATIONS | A04 | A05 | A06 | A07
WORD ADDRESS LOCATIONS | 502 | 503
(HEXADECIMAL)

OPERAND 2- MULTIPLICAND-ASCII, TRAILING SIGN

| (0) | (0) | (9) | (8) | (7) | (6) | (5) | (4) | (3) | (2) | (1) | (0) | (+) |  |
|---|---|---|---|---|---|---|---|---|---|---|---|---|---|
| 30 | 30 | 39 | 38 | 37 | 36 | 35 | 34 | 33 | 32 | 31 | 30 | 2B | X X |
| 10A0 | 10A1 | 10A2 | 10A3 | 10A4 | 10A5 | 10A6 | 10A7 | 10A8 | 10A9 | 10AA | 10AB | 10AC | 10AD |
| 850 | | 851 | | 852 | | 853 | | 854 | | 855 | | 856 | |

| MAIN MEMORY 4 WORD ADDRESS LOCATIONS | DATA | DESCRIPTION | |
|---|---|---|---|
| 1000 | 0029 | DECIMAL MULTIPLY OPERATION CODE | |
| 1001 | E381 | DATA DESCRIPTOR 1 | OPERAND 1 |
| 1002 | 0002 | DISPLACEMENT 1 | |
| 1003 | 6D01 | DATA DESCRIPTOR 2 | OPERAND 2 |
| 1004 | 0350 | DISPLACEMENT 2 | |

CIP 10 RECEIVES

| FUNCTION CODE | DATA | DESCRIPTION | |
|---|---|---|---|
| 07 | XXXX 0029 | DECIMAL MULTIPLY OPERATION CODE | |
| 09 | X000 0A05 | EFFECTIVE BYTE ADDRESS 1 | OPERAND 1 |
| 0F | XXXX E381 | DATA DESCRIPTOR 1 | |
| 09 | X000 10A0 | EFFECTIVE BYTE ADDRESS 2 | OPERAND 2 |
| 1F | XXXX 6D01 | DATA DESCRIPTOR 2 | |

*Fig. 5.*

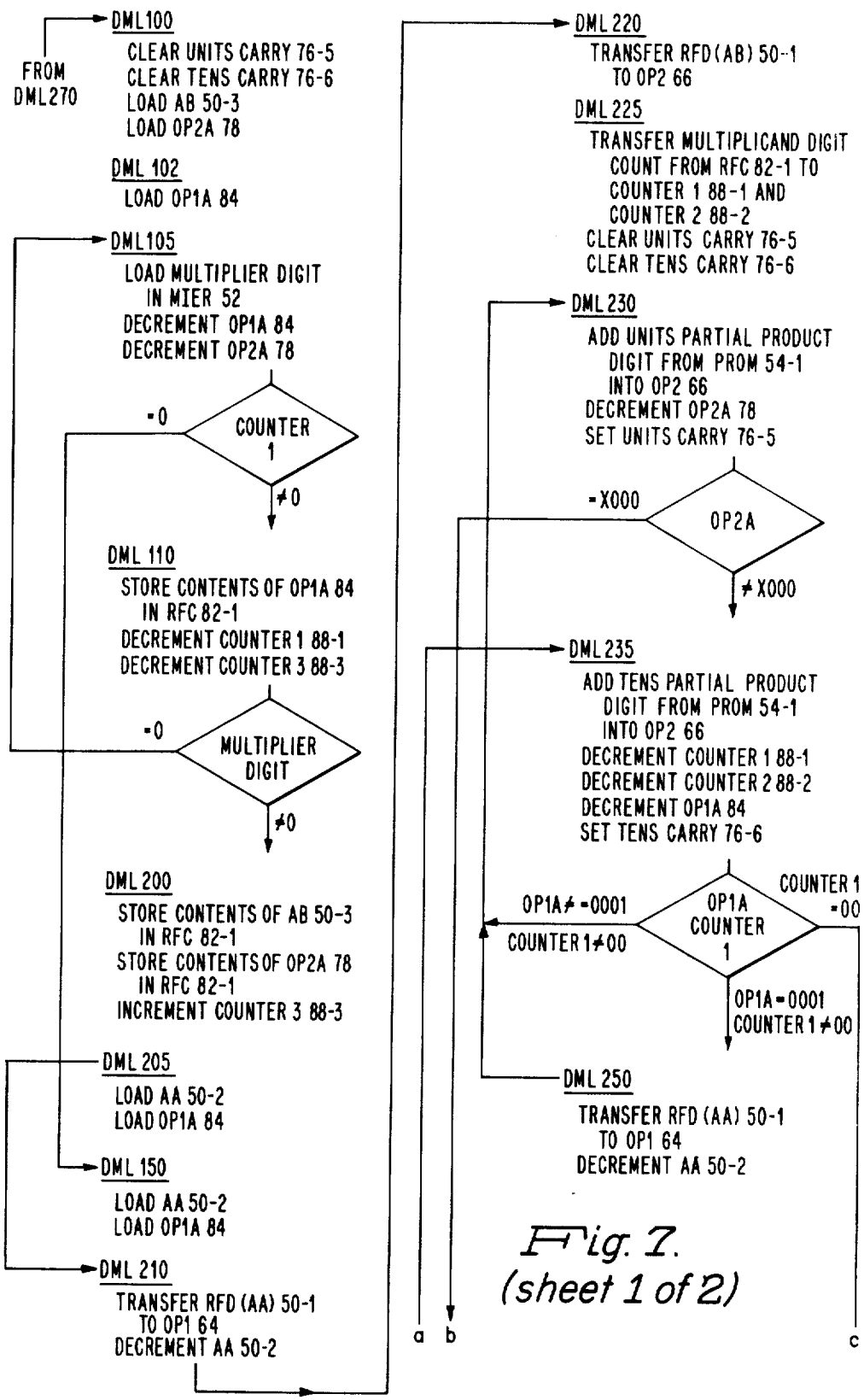
Fig. 7. (sheet 1 of 2)

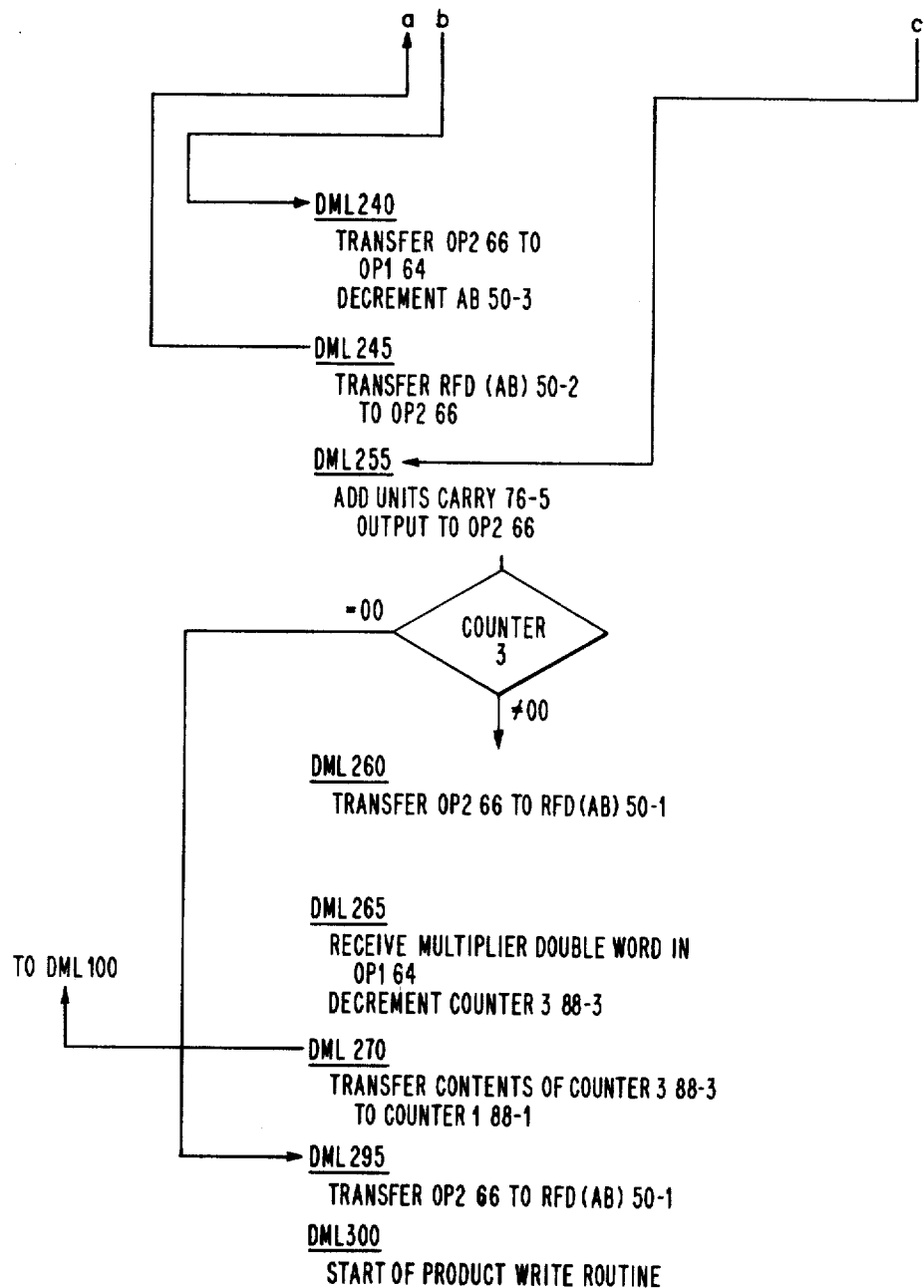
Fig. 7. (sheet 2 of 2)

| DML | COUNTER 1 88-1 | 2 88-2 | 3 88-3 | OP1A 84 | OP1 64 | RFD 50-1 AA 50-2 | AB 50-3 | OP2 66 | OP2A 78 | MIER 52 X OP1 64 | CARRY U T |
|---|---|---|---|---|---|---|---|---|---|---|---|
| 100 |  | 00 |  |  | X X X 7 8 B X X | 8 |  |  | F |  | 0 0 |
| 102 |  |  |  | C | X X X 7 8 B X X |  |  |  | F |  |  |
| 105 |  |  |  | B | X X X 7 8 B X X |  |  |  | E | 8 |  |
| 110 | 00 |  |  | B |  |  |  |  |  |  |  |
| 200 |  |  | 01 | B |  |  |  |  |  |  |  |
| 205 |  |  | 01 | 7 |  |  | F |  |  |  |  |
| 210 |  |  | 01 | 7 | 3 3 3 2 3 1 3 0 |  | E |  |  |  |  |
| 220 |  |  | 01 | 7 |  | 8 |  | 0 0 0 0 0 0 0 0 |  |  |  |
| 225 | 09 | 09 | 01 | 7 |  |  |  | 0 0 0 0 0 0 0 0 | E |  |  |
| 230 | 09 | 09 | 01 | 7 | 3 0 |  |  | 0 0 0 0 0 0 0 0 | D | 8 X 3 0 - X 0 | 0 |
| 235 | 08 | 08 | 01 | 5 | 3 0 |  |  | 0 0 0 0 0 0 0 0 | D | - 0 X | 0 |
| 230 | 08 | 08 | 01 | 5 | 3 1 |  |  | 0 0 0 0 0 8 0 0 | C | 8 X 3 1 - X 8 | 0 |
| 235 | 07 | 07 | 01 | 3 | 3 1 |  |  | 0 0 0 0 0 8 0 0 | C | - 0 X | 0 |
| 230 | 07 | 07 | 01 | 3 | 3 2 |  |  | 0 0 0 0 6 8 0 0 | B | 8 X 3 2 - X 6 | 0 |
| 235 | 06 | 06 | 01 | (0001) 1 | 3 2 |  |  | 0 0 0 1 6 8 0 0 | B | - 1 X | 0 |
| 230 | 06 | 06 | 01 | (0001) 1 | 3 3 |  |  | 0 0 0 5 6 8 0 0 | A | 8 X 3 3 - X 4 | 0 |
| 235 | 05 | 05 | 01 | 7 | 3 3 3 2 3 1 3 0 |  | E | 0 0 2 5 6 8 0 0 | A | - 2 X | 0 |
| 250 | 05 | 05 | 01 | 7 | 3 7 3 6 3 5 3 4 |  | D | 0 0 2 5 6 8 0 0 | A |  |  |
| 230 | 05 | 05 | 01 | 7 | 3 4 |  |  | 0 0 4 5 6 8 0 0 | 9 | 8 X 3 4 - X 2 | 0 |
| 235 | 04 | 04 | 01 | 5 | 3 4 |  |  | 0 3 4 5 6 8 0 0 | 9 | - 3 X | 0 |
| 230 | 04 | 04 | 01 | 5 | 3 5 |  |  | 0 3 4 5 6 8 0 0 | 8 (1000) | 8 X 3 5 - X 0 | 0 |
| 235 | 03 | 03 | 01 | 3 | 3 5 |  |  | 4 3 4 5 6 8 0 0 | 8 (1000) | - 4 X | 0 |
| 230 | 03 | 03 | 01 | 3 | 3 6 | 8 |  | 2 3 4 5 6 8 0 0 | F | 8 X 3 6 - X 8 | 1 |
| 240 | 03 | 03 | 01 | 3 | 3 6 |  | 7 | 2 3 4 5 6 8 0 0 | F |  | 1 |
| 245 | 03 | 03 | 01 | 3 |  |  |  | 0 0 0 0 0 0 0 0 | F |  | 1 |
| 235 | 02 | 02 | 01 | (0001) 1 |  |  |  | 0 0 0 0 0 0 0 4 | F | - 4 X | 1 0 |
| 230 | 02 | 02 | 01 | (0001) 1 | 3 7 |  |  | 0 0 0 0 0 0 0 1 | E | 8 X 3 7 - X 6 | 1 |
| 235 | 01 | 01 | 01 | 7 | 3 7 3 6 3 5 3 4 | D |  | 0 0 0 0 0 0 5 1 | E | - 5 X | 1 0 |
| 250 | 01 | 01 | 01 | 7 | 3 0 3 0 3 9 3 8 | C |  | 0 0 0 0 0 0 5 1 | E |  | 1 |
| 230 | 01 | 01 | 01 | 7 | 3 8 |  |  | 0 0 0 0 0 0 0 1 | D | 8 X 3 8 - X 4 | 1 0 |
| 235 | 00 | 00 | 01 | 5 | 3 8 |  |  | 0 0 0 0 0 6 0 1 | D | - 6 X | 1 |
| 230 | 00 | 00 | 01 | 5 | 3 9 |  |  | 0 0 0 0 0 9 0 1 | C | 8 X 3 9 - X 2 | 0 0 |
| 235 | FF | FF | 01 | 3 | 3 9 |  |  | 0 0 0 0 7 9 0 1 | C | - 7 X | 0 |
| 255 | FF | FF | 01 | 3 |  | 7 |  | 0 0 0 0 7 9 0 1 | C |  |  |
| 260 | FF | FF | 01 | 3 | 3 0 3 0 3 9 3 8 |  | 7 | 0 0 0 0 7 9 0 1 | C |  |  |

| DML | COUNTER 1 88-1 | COUNTER 2 88-2 | COUNTER 3 88-3 | OP1A 84 | OP1 64 | RFD 50-1 AA 50-2 | RFD AB 50-3 | OP2 66 | OP2A 78 | MIER 52 X OP1 64 | CARRY U | CARRY T |
|---|---|---|---|---|---|---|---|---|---|---|---|---|
| 265 | | | 00 | C | X X X 7 8 B X X | | | | E | | | |
| 270 | 00 | | 00 | C | | | | 8 | E | | | |
| 100 | | | | C | | | | | | | | |
| 102 | | | | B | | | | | | | | |
| 105 | | | | A | X X X 7 8 B X X | | | | D | 7 | | |
| 150 | | | | 7 | | | | | | | | |
| 210 | | | | 7 | 3 3 3 2 3 1 3 0 | F | | | | | | |
| 220 | | | | 7 | | E | | 8→23 4 5 6 8 0 0 | | | | |
| 225 | 09 | 09 | 00 | 7 | | | | | D | | | |
| 230 | 09 | 09 | 00 | 7 | 3 0 | | | 2 3 4 5 6 8 0 0 | C | 7 X 3 0 - X 0 | 0 | |
| 235 | 08 | 08 | 00 | 5 | 3 0 | | | 2 3 4 5 6 8 0 0 | C | - 0 X | 0 | |
| 230 | 08 | 08 | 00 | 5 | 3 1 | | | 2 3 4 5 3 8 0 0 | B | 7 X 3 1 - X 7 | 1 | |
| 235 | 07 | 07 | 00 | 3 | 3 1 | | | 2 3 4 5 3 8 0 0 | B | - 0 X | 1 | 0 |
| 230 | 07 | 07 | 00 | 3 | 3 2 | | | 2 3 4 0 3 8 0 0 | A | 7 X 3 2 - X 4 | 1 | |
| 235 | 06 | 06 | 00 | 1 | 3 2 | | | 2 3 5 0 3 8 0 0 | A | - 1 X | 1 | 0 |
| 230 | 06 | 06 | 00 | 1 | 3 3 | | | 2 3 7 0 3 8 0 0 | 9 | 7 X 3 3 - X 1 | 1 | |
| 235 | 05 | 05 | 00 | 7 | 3 3 3 2 3 1 3 0 | E | | 2 5 7 0 3 8 0 0 | 9 | - 2 X | 0 | 0 |
| 250 | 05 | 05 | 00 | 7 | 3 7 3 6 3 5 3 4 | D | | | 9 | | | 0 |
| 230 | 05 | 05 | 00 | 7 | 3 4 | | | 2 3 7 0 3 8 0 0 | 8(1000) | 7 X 3 4 - X 8 | 1 | |
| 235 | 04 | 04 | 00 | 5 | 3 4 | | | 4 3 7 0 3 8 0 0 | 8(1000) | - 2 X | 1 | 0 |
| 230 | 04 | 04 | 00 | 5 | 3 5 | | 8 | 0 3 7 0 3 0 0 0 | F(1111) | 7 X 3 5 - X 5 | 1 | |
| 240 | 04 | 04 | 00 | 5 | 3 5 | | 7 | 0 3 7 0 3 8 0 0 | F | | 1 | |
| 245 | 04 | 04 | 00 | 5 | | | | 0 0 0 0 7 9 0 1 | F | | 1 | |
| 235 | 03 | 03 | 00 | 3 | 3 5 | | | 0 0 0 0 7 9 0 4 | F | - 3 X | 1 | 0 |
| 230 | 03 | 03 | 00 | 3 | 3 6 | | | 0 0 0 0 7 9 0 7 | E | 7 X 3 6 - X 2 | 0 | |
| 235 | 02 | 02 | 00 | 1 | 3 6 | | | 0 0 0 0 7 9 4 7 | E | - 4 X | 0 | 0 |
| 230 | 02 | 02 | 00 | 1 | 3 7 | | | 0 0 0 0 7 9 3 7 | D | 7 X 3 7 - X 9 | 1 | |
| 235 | 01 | 01 | 00 | 7 | 3 7 3 6 3 5 3 4 | D | | 0 0 0 0 7 3 3 7 | D | - 4 X | 1 | 1 |
| 250 | 01 | 01 | 00 | 7 | 3 0 3 0 3 9 3 8 | C | | | D | | | 1 |
| 230 | 01 | 01 | 00 | 7 | 3 8 | | | 0 0 0 0 7 0 3 7 | C | 7 X 3 8 - X 6 | 1 | 1 |
| 235 | 00 | 00 | 00 | 5 | 3 8 | | | 0 0 0 3 0 3 7 | C | - 5 X | 1 | 1 |
| 230 | 00 | 00 | 00 | 5 | 3 9 | | | 0 0 0 0 7 0 3 7 | B | 7 X 3 9 - X 3 | 0 | 1 |
| 235 | FF | FF | 00 | 3 | 3 9 | | | 0 0 0 7 7 0 3 7 | B | - 6 X | 0 | 0 |
| 255 | FF | FF | 00 | 3 | 3 0 3 0 3 9 3 8 | | 7 | 0 0 0 7 7 0 3 7 | | | | |
| 295 | | | | | | | | 0 0 0 7 7 0 3 7 | | | | |

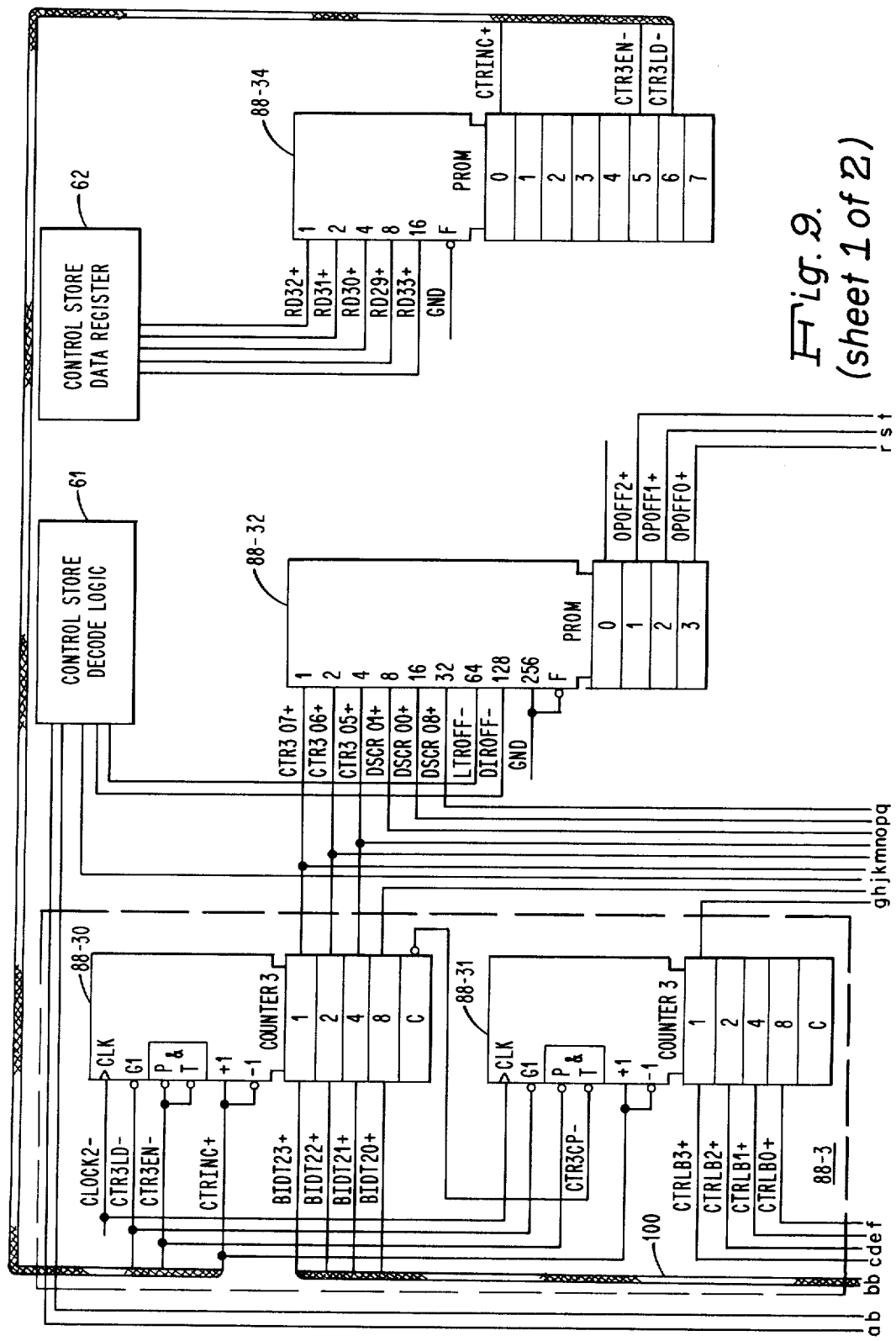
Fig. 9. (sheet 1 of 2)

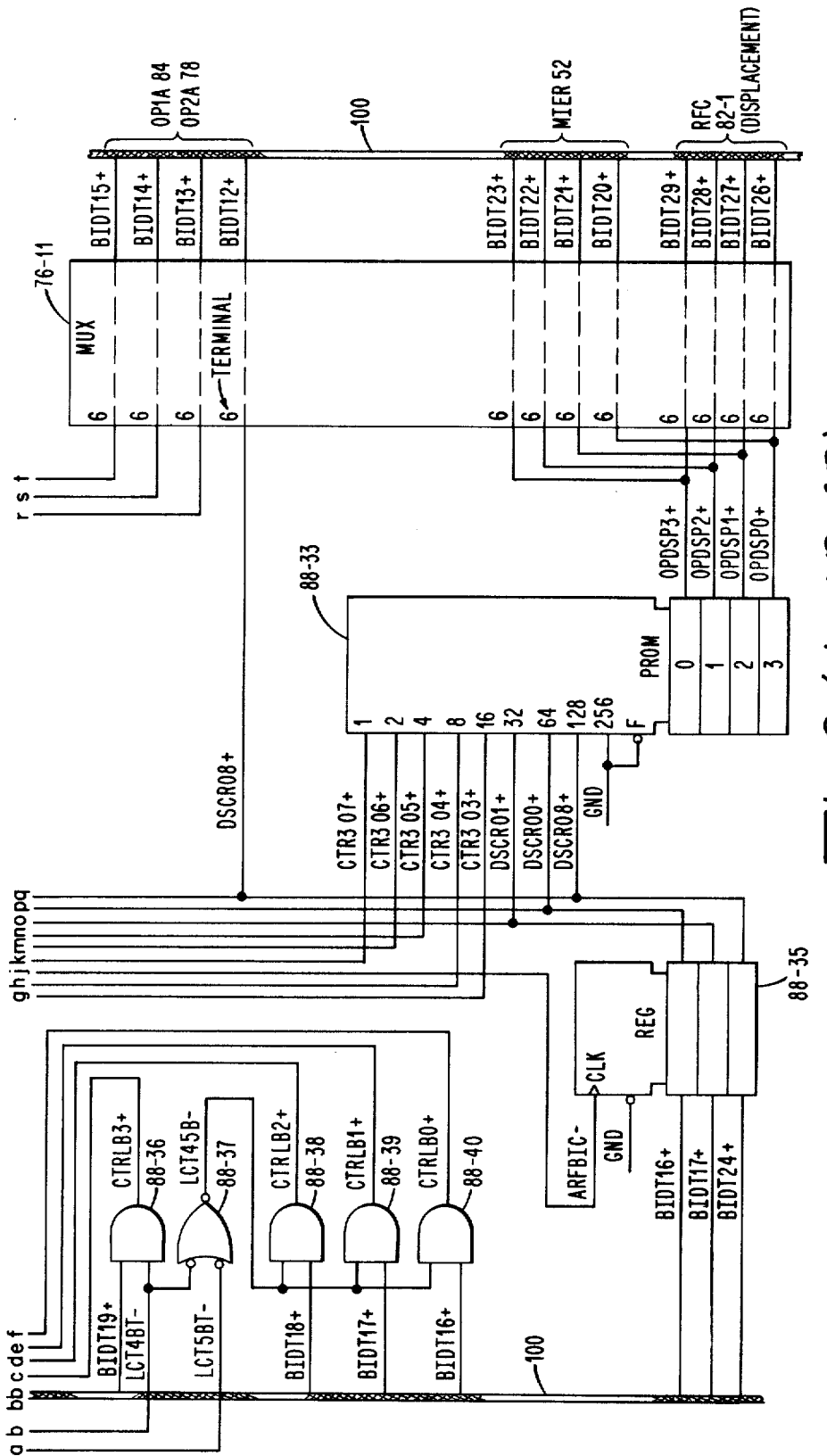
Fig. 9. (sheet 2 of 2)

ADDRESS DISPLACEMENT READ ONLY MEMORY 88-33

| INPUT ADDRESS | | | | | | | COMMENTS | OUTPUT | | | |
|---|---|---|---|---|---|---|---|---|---|---|---|
| 128 | 64 | 32 | 16 | 8 | 4 | 2 | 1 | | 3 | 2 | 1 | 0 |
| DSCR08+ | DSC R00+ | DSCR01+ | CTRR3 03+ | CTRR3 04+ | CTRR3 05+ | CTRR3 06+ | CTR3 07+ | | 0PDSP0+ | PDSP1+ | PDSP2+ | PDSP3+ |

| 128 | 64 | 32 | 16 | 8 | 4 | 2 | 1 | COMMENTS | 3 | 2 | 1 | 0 |
|---|---|---|---|---|---|---|---|---|---|---|---|---|
| 1 | 1 | 0 | 0 | 0 | 0 | X | X | PKD,OFF=2,L=0-3 | 0 | 0 | 0 | 0 |
| 1 | 1 | 0 | 0 | 0 | 1 | 0 | X | PKD,OFF=2,L=4,5 | 0 | 0 | 0 | 0 |
| 1 | 1 | 0 | 0 | 0 | 1 | 1 | 0 | PKD,OFF=2,L=6 | 0 | 0 | 0 | 0 |
| 1 | 1 | 0 | 0 | 0 | 1 | 1 | 1 | PKD,OFF=2,L=7 | 0 | 0 | 0 | 1 |
| 1 | 1 | 0 | 0 | 1 | 0 | X | X | PKD,OFF=2,L=8-11 | 0 | 0 | 0 | 1 |
| 1 | 1 | 0 | 0 | 1 | 1 | 0 | X | PKD,OFF=2,L=12,13 | 0 | 0 | 0 | 1 |
| 1 | 1 | 0 | 0 | 1 | 1 | 1 | 0 | PKD,OFF=2,L=14 | 0 | 0 | 0 | 1 |
| 1 | 1 | 0 | 0 | 1 | 1 | 1 | 1 | PKD,OFF=2,L=15 | 0 | 0 | 1 | 0 |
| 1 | 1 | 0 | 1 | 0 | 0 | X | X | PKD,OFF=2,L=16-19 | 0 | 0 | 1 | 0 |
| 1 | 1 | 0 | 1 | 0 | 1 | 0 | X | PKD,OFF=2,L=20,21 | 0 | 0 | 1 | 0 |
| 1 | 1 | 0 | 1 | 0 | 1 | 1 | 0 | PKD,OFF=2,L=22 | 0 | 0 | 1 | 0 |
| 1 | 1 | 0 | 1 | 0 | 1 | 1 | 1 | PKD,OFF=2,L=23 | 0 | 0 | 1 | 1 |
| 1 | 1 | 0 | 1 | 1 | 0 | X | X | PKD,OFF=2,L=24-27 | 0 | 0 | 1 | 1 |
| 1 | 1 | 0 | 1 | 1 | 1 | 0 | X | PKD,OFF=2,L=28,29 | 0 | 0 | 1 | 1 |
| 1 | 1 | 0 | 1 | 1 | 1 | 1 | 0 | PKD,OFF=2,L=30 | 0 | 0 | 1 | 1 |
| 1 | 1 | 0 | 1 | 1 | 1 | 1 | 1 | PKD,OFF=2,L=31 | 0 | 1 | 0 | 0 |
| 1 | 1 | 1 | 0 | 0 | 0 | X | X | PKD,OFF=3,L=0-3 | 0 | 0 | 0 | 0 |
| 1 | 1 | 1 | 0 | 0 | 1 | 0 | X | PKD,OFF=3,L=4,5 | 0 | 0 | 0 | 0 |
| 1 | 1 | 1 | 0 | 0 | 1 | 1 | X | PKD,OFF=3,L=6,7 | 0 | 0 | 0 | 1 |
| 1 | 1 | 1 | 0 | 1 | 0 | X | X | PKD,OFF=3,L=8-11 | 0 | 0 | 0 | 1 |
| 1 | 1 | 1 | 0 | 1 | 1 | 0 | X | PKD,OFF=3,L=12,13 | 0 | 0 | 0 | 1 |
| 1 | 1 | 1 | 0 | 1 | 1 | 1 | X | PKD,OFF=3,L=14,15 | 0 | 0 | 1 | 0 |
| 1 | 1 | 1 | 1 | 0 | 0 | X | X | PKD,OFF=3,L=16-19 | 0 | 0 | 1 | 0 |
| 1 | 1 | 1 | 1 | 0 | 1 | 0 | X | PKD,OFF=3,L=20,21 | 0 | 0 | 1 | 0 |
| 1 | 1 | 1 | 1 | 0 | 1 | 1 | X | PKD,OFF=3,L=22,23 | 0 | 0 | 1 | 1 |
| 1 | 1 | 1 | 1 | 1 | 0 | X | X | PKD,OFF=3,L=24-27 | 0 | 0 | 1 | 1 |
| 1 | 1 | 1 | 1 | 1 | 1 | 0 | X | PKD,OFF=3,L=28,29 | 0 | 0 | 1 | 1 |
| 1 | 1 | 1 | 1 | 1 | 1 | 1 | X | PKD,OFF=3,L=30,31 | 0 | 1 | 0 | 0 |

ADDRESS DISPLACEMENT READ ONLY MEMORY 88-33

| INPUT ADDRESS | | | | | | | | COMMENTS | OUTPUT | | | |
|---|---|---|---|---|---|---|---|---|---|---|---|---|
| 128 | 64 | 32 | 16 | 8 | 4 | 2 | 1 | | 3 | 2 | 1 | 0 |
| DSCR0 8+ | DSCR0 0+ | DSCR0 1+ | CTR3 3+ | CTR3 3+ | CTR3 3+ | CTR3 3+ | CTR3 3+ | | 0PDSP0 0+ | 0PDSP0 1+ | 0PDSP0 2+ | 0PDSP0 3+ |
| 0 | 0 | X | 0 | 0 | 0 | X | X | STR,OFF=0,L=0-3 | 0 | 0 | 0 | 0 |
| 0 | 0 | X | 0 | 0 | 1 | 0 | 0 | STR,OFF=0,L=4 | 0 | 0 | 0 | 0 |
| 0 | 0 | X | 0 | 0 | 1 | 0 | 1 | STR,OFF=0,L=5 | 0 | 0 | 0 | 1 |
| 0 | 0 | X | 0 | 0 | 1 | 1 | X | STR,OFF=0,L=6,7 | 0 | 0 | 0 | 1 |
| 0 | 0 | X | 0 | 1 | 0 | 0 | 0 | STR,OFF=0,L=8 | 0 | 0 | 0 | 1 |
| 0 | 0 | X | 0 | 1 | 0 | 0 | 1 | STR,OFF=0,L=9 | 0 | 0 | 1 | 0 |
| 0 | 0 | X | 0 | 1 | 0 | 1 | X | STR,OFF=0,L=10,11 | 0 | 0 | 1 | 0 |
| 0 | 0 | X | 0 | 1 | 1 | 0 | 0 | STR,OFF=0,L=12 | 0 | 0 | 1 | 0 |
| 0 | 0 | X | 0 | 1 | 1 | 0 | 1 | STR,OFF=0,L=13 | 0 | 0 | 1 | 1 |
| 0 | 0 | X | 0 | 1 | 1 | 1 | X | STR,OFF=0,L=14,15 | 0 | 0 | 1 | 1 |
| 0 | 0 | X | 1 | 0 | 0 | 0 | 0 | STR,OFF=0,L=16 | 0 | 0 | 1 | 1 |
| 0 | 0 | X | 1 | 0 | 0 | 0 | 1 | STR,OFF=0,L=17 | 0 | 1 | 0 | 0 |
| 0 | 0 | X | 1 | 0 | 0 | 1 | X | STR,OFF=0,L=18,19 | 0 | 1 | 0 | 0 |
| 0 | 0 | X | 1 | 0 | 1 | 0 | 0 | STR,OFF=0,L=20 | 0 | 1 | 0 | 0 |
| 0 | 0 | X | 1 | 0 | 1 | 0 | 1 | STR,OFF=0,L=21 | 0 | 1 | 0 | 1 |
| 0 | 0 | X | 1 | 0 | 1 | 1 | X | STR,OFF=0,L=22,23 | 0 | 1 | 0 | 1 |
| 0 | 0 | X | 1 | 1 | 0 | 0 | 0 | STR,OFF=0,L=24 | 0 | 1 | 0 | 1 |
| 0 | 0 | X | 1 | 1 | 0 | 0 | 1 | STR,OFF=0,L=25 | 0 | 1 | 1 | 0 |
| 0 | 0 | X | 1 | 1 | 0 | 1 | X | STR,OFF=0,L=26,27 | 0 | 1 | 1 | 0 |
| 0 | 0 | X | 1 | 1 | 1 | 0 | 0 | STR,OFF=0,L=28 | 0 | 1 | 1 | 0 |
| 0 | 0 | X | 1 | 1 | 1 | 0 | 1 | STR,OFF=0,L=29 | 0 | 1 | 1 | 1 |
| 0 | 0 | X | 1 | 1 | 1 | 1 | X | STR,OFF=0,L=30,31 | 0 | 1 | 1 | 1 |
| 0 | 1 | X | A | B | C | X | X | STR,OFF=1 | 0 | A | B | C |
| 1 | 0 | 0 | 0 | 0 | X | X | X | PKD,OFF=0,L=0-7 | 0 | 0 | 0 | 0 |
| 1 | 0 | 0 | 0 | 1 | 0 | 0 | 0 | PKD,OFF=0,L=8 | 0 | 0 | 0 | 0 |
| 1 | 0 | 0 | 0 | 1 | 0 | 0 | 1 | PKD,OFF=0,L=9 | 0 | 0 | 0 | 1 |
| 1 | 0 | 0 | 0 | 1 | 0 | 1 | X | PKD,OFF=0,L=10,11 | 0 | 0 | 0 | 1 |
| 1 | 0 | 0 | 0 | 1 | 1 | X | X | PKD,OFF=0,L=12-15 | 0 | 0 | 0 | 1 |
| 1 | 0 | 0 | 1 | 0 | 0 | 0 | 0 | PKD,OFF=0,L=16 | 0 | 0 | 0 | 1 |
| 1 | 0 | 0 | 1 | 0 | 0 | 0 | 1 | PKD,OFF=0,L=17 | 0 | 0 | 1 | 0 |
| 1 | 0 | 0 | 1 | 0 | 0 | 1 | X | PKD,OFF=0,L=18,19 | 0 | 0 | 1 | 0 |
| 1 | 0 | 0 | 1 | 0 | 1 | X | X | PKD,OFF=0,L=20-23 | 0 | 0 | 1 | 0 |
| 1 | 0 | 0 | 1 | 1 | 0 | 0 | 0 | PKD,OFF=0,L=24 | 0 | 0 | 1 | 0 |
| 1 | 0 | 0 | 1 | 1 | 0 | 0 | 1 | PKD,OFF=0,L=25 | 0 | 0 | 1 | 1 |
| 1 | 0 | 0 | 1 | 1 | 0 | 1 | X | PKD,OFF=0,L=26,27 | 0 | 0 | 1 | 1 |
| 1 | 0 | 0 | 1 | 1 | 1 | X | X | PKD,OFF=0,L=28-31 | 0 | 0 | 1 | 1 |
| 1 | 0 | 1 | A | B | X | X | X | PKD,OFF=1 | 0 | 0 | A | B |

X   IGNORE VALUE
A ⎫
B ⎬ INPUT VALUES COPIED TO OUTPUT
C ⎭
PKD   OPERAND IS PACKED·BCD DIGITS
STR   OPERAND IS AN ASCII STRING

OFF   DATA DESCRIPTOR OFFSET
       BIT 0 OF DD FOR STRING
       BIT 0, 1 OF DD FOR PACKED
L   ACTUAL OPERAND LENGTH

DIGIT OFFSET READ ONLY MEMORY 88-32

```
           INPUT ADDRESS                                              OUTPUT
  128 64 32 16  8  4  2  1              COMMENTS

D   L  D  D  D  C  C  C    LTR: LEFT-TO-RIGHT                     0  0  0
   I   T  S  S  S  T  T  T    RTL: RIGHT-TO-LEFT                     P  P  P
   R   R  C  C  C  R  R  R    OFF: DD(C0) FOR STRING(STR)            0  0  0
   0   0  R  R  R  3  3  3         DD(C0,C1) FOR (PKD)                F  F  F
   F   F  0  0  0  0  0  0    DIR: DIRECT FROM DSCR                   F  F  F
   F   F  8  0  1  5  6  7    (MOD N): CTR3 MOD N                     0  1  2
   -   -  +  +  +  +  +  +                                            +  +  +

0   1  0  0  X  X  X  X    DIR-STR-OFF=0                           0  0  1
   0   1  0  1  X  X  X  X    DIR-STR-OFF=1                           0  1  1
   0   1  1  0  0  X  X  X    DIR-PKD-OFF=0                           0  0  0
   0   1  1  0  1  X  X  X    DIR-PKD-OFF=1                           0  0  1
   0   1  1  1  0  X  X  X    DIR-PKD-OFF=2                           0  1  0
   0   1  1  1  1  X  X  X    DIR-PKD-OFF=3                           0  1  1

1   0  0  0  X  X  0  0    LTR-STR-OFF=0-(MOD 4)=0                 0  0  1
   1   0  0  0  X  X  0  1    LTR-STR-OFF=0-(MOD 4)=1                 1  0  1
   1   0  0  0  X  X  1  0    LTR-STR-OFF=0-(MOD 4)=2                 1  0  1
   1   0  0  0  X  X  1  1    LTR-STR-OFF=0-(MOD 4)=3                 0  0  1
   1   0  0  1  X  X  0  0    LTR-STR-OFF=1-(MOD 4)=0                 1  1  1
   1   0  0  1  X  X  0  1    LTR-STR-OFF=1-(MOD 4)=1                 1  1  1
   1   0  0  1  X  X  1  0    LTR-STR-OFF=1-(MOD 4)=2                 0  1  1
   1   0  0  1  X  X  1  1    LTR-STR-OFF=1-(MOD 4)=3                 0  1  1
   1   0  1  0  0  0  0  0    LTR-PKD-OFF=0-(MOD 8)=0                 0  0  0
   1   0  1  0  0  0  0  1    LTR-PKD-OFF=0-(MOD 8)=1                 1  0  0
   1   0  1  0  0  0  1  X    LTR-PKD-OFF=0-(MOD 8)=2,3               1  0  0
   1   0  1  0  0  1  0  0    LTR-PKD-OFF=0-(MOD 8)=4                 1  0  0
   1   0  1  0  0  1  0  1    LTR-PKD-OFF=0-(MOD 8)=5                 0  0  0
   1   0  1  0  0  1  1  X    LTR-PKD-OFF=0-(MOD 8)=6,7               0  0  0
   1   0  1  0  1  0  X  X    LTR-PKD-OFF=1-(MOD 8)=0-3               1  0  1
   1   0  1  0  1  1  X  X    LTR-PKD-OFF=1-(MOD 8)=4-7               0  0  1
   1   0  1  1  0  0  0  X    LTR-PKD-OFF=2-(MOD 8)=0,1               1  1  0
   1   0  1  1  0  0  1  0    LTR-PKD-OFF=2-(MOD 8)=2                 1  1  0
   1   0  1  1  0  0  1  1    LTR-PKD-OFF=2-(MOD 8)=3                 0  1  0
   1   0  1  1  0  1  0  X    LTR-PKD-OFF=2-(MOD 8)=4,5               0  1  0
   1   0  1  1  0  1  1  0    LTR-PKD-OFF=2-(MOD 8)=6                 0  1  0
   1   0  1  1  0  1  1  1    LTR-PKD-OFF=2-(MOD 8)=7                 1  1  0
   1   0  1  1  1  0  0  X    LTR-PKD-OFF=3-(MOD 8)=0,1               1  1  1
   1   0  1  1  1  0  1  X    LTR-PKD-OFF=3-(MOD 8)=2,3               0  1  1
   1   0  1  1  1  1  0  X    LTR-PKD-OFF=3-(MOD 8)=4,5               0  1  1
   1   0  1  1  1  1  1  X    LTR-PKD-OFF=3-(MOD 8)=6,7               1  1  1
```

DIGIT OFFSET READ ONLY MEMORY 88-32

| INPUT ADDRESS | | | | | | | COMMENTS | OUTPUT | | |
|---|---|---|---|---|---|---|---|---|---|---|
| 128 | 64 | 32 | 16 | 8 | 4 | 2 | 1 | | | | |
| D | L | D | D | D | C | C | C | LTR: LEFT-TO-RIGHT | 0 | 0 | 0 |
| I | T | S | S | S | T | T | T | RTL: RIGHT-TO-LEFT | P | P | P |
| R | R | C | C | C | R | R | R | OFF: DD(C0) FOR STRING(STR) | 0 | 0 | 0 |
| O | O | R | R | R | 3 | 3 | 3 | DD(C0,C1) FOR (PKD) | F | F | F |
| F | F | 0 | 0 | 0 | 0 | 0 | 0 | DIR: DIRECT FROM DSCR | F | F | F |
| F | F | 8 | 0 | 1 | 5 | 6 | 7 | (MOD N): CTR3 MOD N | 0 | 1 | 2 |
| − | − | + | + | + | + | + | + | | + | + | + |
| 1 | 1 | 0 | 0 | X | X | 0 | 0 | RTL-STR-OFF=0-(MOD 4)=0 | 1 | 1 | 1 |
| 1 | 1 | 0 | 0 | X | X | 0 | 1 | RTL-STR-OFF=0-(MOD 4)=1 | 0 | 0 | 1 |
| 1 | 1 | 0 | 0 | X | X | 1 | 0 | RTL-STR-OFF=0-(MOD 4)=2 | 0 | 1 | 1 |
| 1 | 1 | 0 | 0 | X | X | 1 | 1 | RTL-STR-OFF=0-(MOD 4)=3 | 1 | 0 | 1 |
| 1 | 1 | 0 | 1 | X | X | 0 | 0 | RTL-STR-OFF=1-(MOD 4)=0 | 0 | 0 | 1 |
| 1 | 1 | 0 | 1 | X | X | 0 | 1 | RTL-STR-OFF=1-(MOD 4)=1 | 0 | 1 | 1 |
| 1 | 1 | 0 | 1 | X | X | 1 | 0 | RTL-STR-OFF=1-(MOD 4)=2 | 1 | 0 | 1 |
| 1 | 1 | 0 | 1 | X | X | 1 | 1 | RTL-STR-OFF=1-(MOD 4)=3 | 1 | 1 | 1 |
| 1 | 1 | 1 | 0 | 0 | 0 | 0 | 0 | RTL-PKD-OFF=0-(MOD 8)=0 | 1 | 1 | 1 |
| 1 | 1 | 1 | 0 | 0 | 0 | 0 | 1 | RTL-PKD-OFF=0-(MOD 8)=1 | 0 | 0 | 0 |
| 1 | 1 | 1 | 0 | 0 | 0 | 1 | 0 | RTL-PKD-OFF=0-(MOD 8)=2 | 0 | 0 | 1 |
| 1 | 1 | 1 | 0 | 0 | 0 | 1 | 1 | RTL-PKD-OFF=0-(MOD 8)=3 | 0 | 1 | 0 |
| 1 | 1 | 1 | 0 | 0 | 1 | 0 | 0 | RTL-PKD-OFF=0-(MOD 8)=4 | 0 | 1 | 1 |
| 1 | 1 | 1 | 0 | 0 | 1 | 0 | 1 | RTL-PKD-OFF=0-(MOD 8)=5 | 1 | 0 | 0 |
| 1 | 1 | 1 | 0 | 0 | 1 | 1 | 0 | RTL-PKD-OFF=0-(MOD 8)=6 | 1 | 0 | 1 |
| 1 | 1 | 1 | 0 | 0 | 1 | 1 | 1 | RTL-PKD-OFF=0-(MOD 8)=7 | 1 | 1 | 0 |
| 1 | 1 | 1 | 0 | 1 | 0 | 0 | 0 | RTL-PKD-OFF=1-(MOD 8)=0 | 0 | 0 | 0 |
| 1 | 1 | 1 | 0 | 1 | 0 | 0 | 1 | RTL-PKD-OFF=1-(MOD 8)=1 | 0 | 0 | 1 |
| 1 | 1 | 1 | 0 | 1 | 0 | 1 | 0 | RTL-PKD-OFF=1-(MOD 8)=2 | 0 | 1 | 0 |
| 1 | 1 | 1 | 0 | 1 | 0 | 1 | 1 | RTL-PKD-OFF=1-(MOD 8)=3 | 0 | 1 | 1 |
| 1 | 1 | 1 | 0 | 1 | 1 | 0 | 0 | RTL-PKD-OFF=1-(MOD 8)=4 | 1 | 0 | 0 |
| 1 | 1 | 1 | 0 | 1 | 1 | 0 | 1 | RTL-PKD-OFF=1-(MOD 8)=5 | 1 | 0 | 1 |
| 1 | 1 | 1 | 0 | 1 | 1 | 1 | 0 | RTL-PKD-OFF=1-(MOD 8)=6 | 1 | 1 | 0 |
| 1 | 1 | 1 | 0 | 1 | 1 | 1 | 1 | RTL-PKD-OFF=1-(MOD 8)=7 | 1 | 1 | 1 |
| 1 | 1 | 1 | 1 | 0 | 0 | 0 | 0 | RTL-PKD-OFF=2-(MOD 8)=0 | 0 | 0 | 1 |
| 1 | 1 | 1 | 1 | 0 | 0 | 0 | 1 | RTL-PKD-OFF=2-(MOD 8)=1 | 0 | 1 | 0 |
| 1 | 1 | 1 | 1 | 0 | 0 | 1 | 0 | RTL-PKD-OFF=2-(MOD 8)=2 | 0 | 1 | 1 |
| 1 | 1 | 1 | 1 | 0 | 0 | 1 | 1 | RTL-PKD-OFF=2-(MOD 8)=3 | 1 | 0 | 0 |
| 1 | 1 | 1 | 1 | 0 | 1 | 0 | 0 | RTL-PKD-OFF=2-(MOD 8)=4 | 1 | 0 | 1 |
| 1 | 1 | 1 | 1 | 0 | 1 | 0 | 1 | RTL-PKD-OFF=2-(MOD 8)=5 | 1 | 1 | 0 |
| 1 | 1 | 1 | 1 | 0 | 1 | 1 | 0 | RTL-PKD-OFF=2-(MOD 8)=6 | 1 | 1 | 1 |
| 1 | 1 | 1 | 1 | 0 | 1 | 1 | 1 | RTL-PKD-OFF=2-(MOD 8)=7 | 0 | 0 | 0 |
| 1 | 1 | 1 | 1 | 1 | 0 | 0 | 0 | RTL-PKD-OFF=3-(MOD 8)=0 | 0 | 1 | 0 |
| 1 | 1 | 1 | 1 | 1 | 0 | 0 | 1 | RTL-PKD-OFF=3-(MOD 8)=1 | 0 | 1 | 1 |
| 1 | 1 | 1 | 1 | 1 | 0 | 1 | 0 | RTL-PKD-OFF=3-(MOD 8)=2 | 1 | 0 | 0 |
| 1 | 1 | 1 | 1 | 1 | 0 | 1 | 1 | RTL-PKD-OFF=3-(MOD 8)=3 | 1 | 0 | 1 |
| 1 | 1 | 1 | 1 | 1 | 1 | 0 | 0 | RTL-PKD-OFF=3-(MOD 8)=4 | 1 | 1 | 0 |
| 1 | 1 | 1 | 1 | 1 | 1 | 0 | 1 | RTL-PKD-OFF=3-(MOD 8)=5 | 1 | 1 | 1 |
| 1 | 1 | 1 | 1 | 1 | 1 | 1 | 0 | RTL-PKD-OFF=3-(MOD 8)=6 | 0 | 0 | 0 |
| 1 | 1 | 1 | 1 | 1 | 1 | 1 | 1 | RTL-PKD-OFF=3-(MOD 8)=7 | 0 | 0 | 1 |

X   IGNORE VALUE
PKD OPERAND IS PACKED BCD DIGITS
STR OPERAND IS AN ASCII STRING

DATA PROCESSOR USING READ ONLY MEMORIES FOR OPTIMIZING MAIN MEMORY ACCESS AND IDENTIFYING THE STARTING POSITION OF AN OPERAND

RELATED APPLICATIONS

The following U.S. patent applications filed on an even date with the instant application and assigned to the same assignee as the instant application are related to the instant application and are incorporated by reference.

1. "A Data Process Performing a Decimal Multiply Operation Using a Read Only Memory" by Virendra S. Negi and Steven A. Tague, filed on Dec. 24, 1980 and having U.S. Ser. No. 220,218.

2. "A Data Processor Having Units Carry and Tens Carry Apparatus Supporting a Decimal Multiply Operation" by Virendra S. Negi and Steven A. Tague, filed on Dec. 24, 1980 and having U.S. Ser. No. 219,810.

3. "A Data Processor Having Carry Apparatus Supporting a Decimal Divide Operation" by Virendra S. Negi and Steven A. Tague, issued on May 17, 1983 and having U.S. Pat. No. 4,384,341.

4. "A Data Processor Having Apparatus for Controlling the Selection of Decimal Digits of an Operand When Executing Decimal Arithmetic Instructions" by Steven A. Tague and Virendra S. Negi, issued on May 17, 1983 and having U.S. Pat. No. 4,384,340.

5. "A Data Processor Using a Read Only Memory for Selecting a Part of a Register Into Which Data Is Written" by Steven A. Tague and Virendra S. Negi, filed on Dec. 24, 1980 and having U.S. Ser. No. 220,219.

BACKGROUND OF THE INVENTION

1. Field of the Invention

This invention relates generally to the execution of decimal alphanumeric instructions by a commercial instruction processor of a data processing system and more specifically to apparatus that indicates operand alignment in response to data descriptor information.

2. Description of the Prior Art

The number of steps required to execute a decimal alphanumeric instruction are normally reduced if the operands involved which are read from main memory are aligned relative to each other. Some instructions such as a decimal add instruction require the two operands have the least significant decimal digits aligned. A decimal alphanumeric compare instruction requires that the two operands have the high order characters aligned. For the decimal add instruction, successive operand words are transferred from main memory low order word first and for the decimal alphanumeric compare instruction, successive operand words are transferred from main memory high order word first.

The operands may be in string decimal form, typically two byte positions per word, or in packed decimal form, typically four decimal digit positions. The operand high order or low order byte or digit may be stored in either a byte position or any digit position of the word.

The characteristics of the operand may be defined by words called data descriptors and are usually transferred from memory following the instruction word. The data descriptor information may include a binary bit indicating a string or packed decimal operand, a binary field indicating the number of bytes or digits in the operand, the position in the high order word of the high order byte or digit, and the location of the sign character, a trailing, leading or "overpunched" sign.

Apparatus for receiving data descriptors and generating signals for aligning the operands is described in U.S. Pat. No. 4,276,596 issued June 30, 1981 entitled "Short Operand Alignment and Merge Operation", and U.S. Pat. No. 4,240,144 issued Dec. 16, 1980 entitled "Long Operand Alignment and Merge Operation" which describe apparatus which is responsive to data descriptor information for generating signals used in aligning the operands. The apparatus for generating the alignment signals included a number of logic elements including registers, adders and control circuits.

OBJECTS OF THE INVENTION

Accordingly, it is a primary object of the invention to provide a data processing system with improved apparatus for generating alignment signals.

It is another object of the invention to provide a central instruction processor with improved apparatus for generating alignment signals using fewer logic elements thereby reducing the product and maintenance cost.

SUMMARY OF THE INVENTION

A data processing system includes a commercial instruction processor (CIP) which executes decimal instructions. The operands are in string decimal form or in packed decimal form. A word in string decimal form may include 2 bytes, each byte having a zone portion and a digit portion. A word in packed decimal form may include up to 4 decimal digits. The high order byte or digit of the operand may reside in one of two byte positions or any 1 of 4 digit positions in the high order word.

A decimal alphanumeric instruction is specified by an operation code word. Each operand that is operated upon by the instruction is specified by a data descriptor. The data descriptor specifies whether the operand is in string or packed decimal form, the location of the high order byte or digit in the high order word, and the number of bytes or digits in the operand. The data descriptor also specifies how to use the following word or words to compute the address of the most significant word of the operand.

The length of the operand is stored in a register/counter. Selected register/counter output signals are applied to an address displacement read only memory and a digit offset read only memory.

The address displacement read only memory output signals indicate one less than the number of double words occupied by the operand. This value may be used to anticipate the number of read requests of a main memory and/or to modify the high order word address into the low order word address.

The digit offset read only memory output signals indicate the location of the least significant digit or byte of the least significant word of the operand or the position of the most significant digit or byte of the most significant word of the operand as they will appear in internal double word registers.

Data descriptor signals applied to the input address terminals of the read only memories indicate that the operand is string or packed decimal, and the location within the high order word of the most significant byte if string decimal and the most significant digit if packed decimal.

Control signals are applied to the digit offset read only memory which selects the least significant byte or digit position if the instruction calls for a right-to-left transfer of the operand from main memory (as required on the execution of decimal instructions). The control signals may result in the digit offset read only memory selecting the most significant byte or digit position for instructions such as alphanumeric compare which requires a left-to-right transfer of the operand from main memory.

The control signals may select a direct mode which in the digit offset read only memory indicates the position of the most significant byte or digit without anticipating a left-to-right scan. This mode is also useful in locating the most significant digit after a right-to-left scan.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 2 is a block diagram of the commercial instruction processor 10.

FIG. 3 is a block diagram of that portion of the CIP 10 that relates to the decimal multiply operation.

FIG. 4 is a detailed logic diagram which includes the multiply read only memory 54 which stores the products and the multiply register 52 which stores the multiplier digit.

FIG. 5 shows the elements of a multiplication example which are used to describe the invention.

FIG. 7 is a flow diagram of the multiplication example.

FIG. 8 shows the contents of the registers as the CIP 10 is executing the steps of the flow diagram.

FIG. 9 shows the detailed logic for generating alignment signals.

FIG. 10 shows the layout of the Address Displacement Read Only Memory.

FIG. 11 shows the layout of the Digit Offset Read Only Memory.

DESCRIPTION OF THE PREFERRED EMBODIMENT

Figure 1:
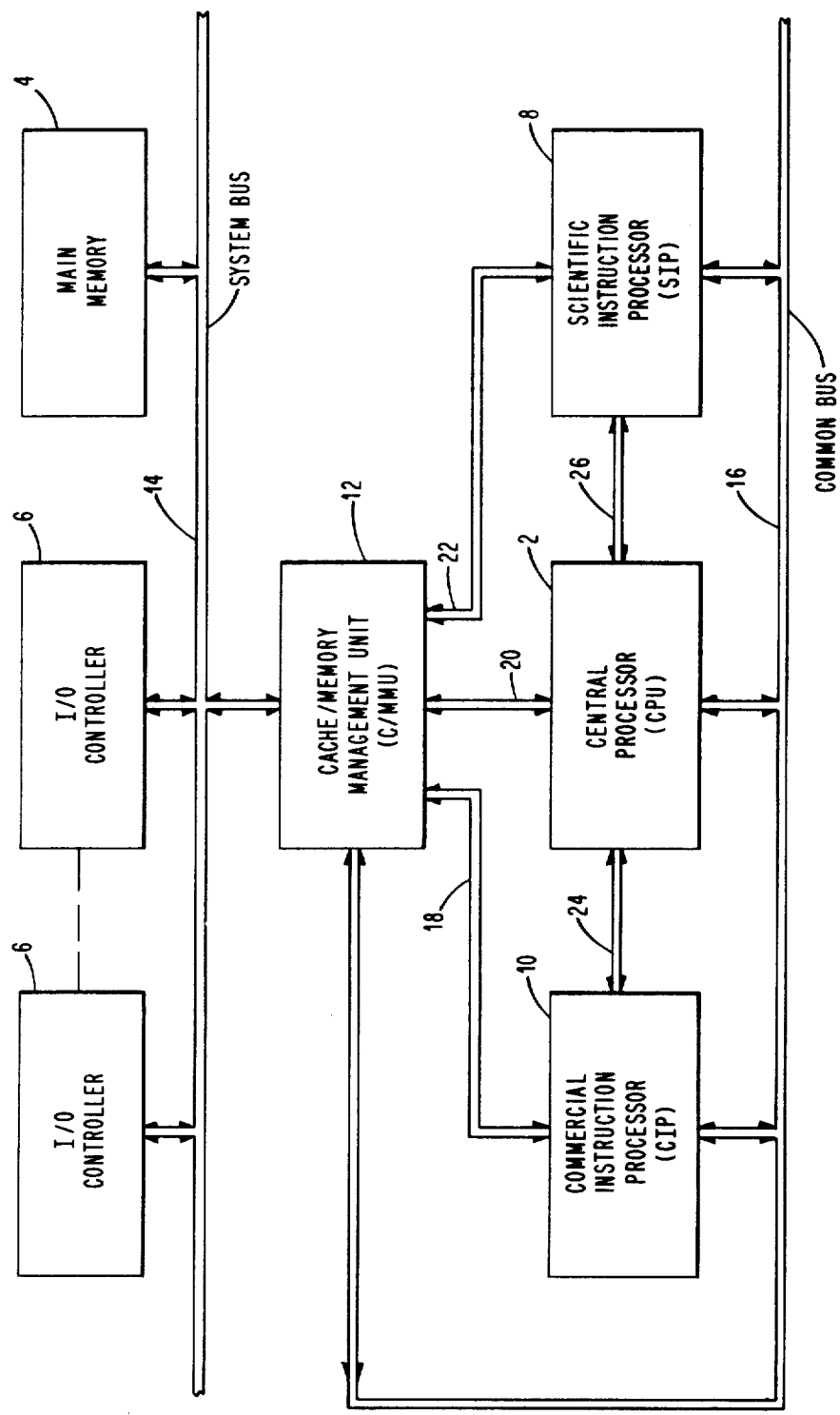
FIG. 1 is a block diagram of the overall data processing system.

FIG. 1 is an overall block diagram of a data processing system which includes a main memory 4, a plurality of input/output controllers 6 and a cache/memory management unit (C/MMU) 12; all coupled in common to a system bus 14. Coupled to the C/MMU 12 are a central processor unit (CPU) 2, a commercial instruction processor (CIP) 10 and a scientific instruction processor (SIP) 8 via buses 20, 18 and 22 respectively. The C/MMU 12, CIP 10, CPU 2 and SIP 8 are coupled in common to a common bus 16. Also, CPU 2 is coupled to the CIP 10 and the SIP 8 via buses 24 and 26, respectively.

The CIP 10 executes a set of instructions designed to facilitate the processing of character strings and decimal data. The SIP 8 executes a set of scientific instructions particularly useful for FORTRAN applications. This set includes arithmetic operations on single and double precision floating point operands and single and double word integer operands.

All instructions in a program under execution are received by CPU 2 from C/MMU 12 via buses 16 and 20. CPU 2 determines from the operation code of the instructions if the instruction is to be processed by the CPU 2, the CIP 10, or the SIP 8. The CPU 2 receives status information from the CIP 10 or SIP 8 over buses 24 and 26, respectively. If the CIP 10 or SIP 8 is available, the CPU 2 sends the necessary information out on common bus 16 and also bus 26 for the SIP 8. The CIP 10 or the SIP 8 processes the instruction and is operative with the C/MMU 12 via bus 18 or 22 respectively and bus 16 for processing the instruction.

The CIP 10 processes instructions which include the following:
1. Decimal arithmetic operations on string and packed numeric data.
2. Alphanumeric and decimal move and compare instructions.
3. Conversion between binary and decimal numeric representation.
4. Edit instructions.
5. Arithmetic shift instructions.

Main memory 4 stores instructions and data and is operative with the C/MMU 12 for the transferring of instructions and data over system bus 14 under control of CPU 2 via bus 20. This operation is described in U.S. Pat. No. 4,030,075.

The C/MMU 12 which includes a cache memory stores the instructions and data currently being processed by the CPU 2, CIP 10 and SIP 8. The cache operation is described in U.S. Pat. No. 4,195,340.

The CPU 2 is also operative for initiating transfers of data between the I/0 controllers 6 and main memory 4.

Referring to FIG. 2, all CIP 10 operations except initialization operations from a console are initiated by CPU 2 writing a 6 bit function code into a function code register 96 and a 32 bit double word of data into a portion of a common bus data interface 80 via common bus 16. The CIP 10 when activated transfers the low order 6 bits of the double word into an instruction register 56. If the function code register 96 stores an output task function code $07_{16}$, then the low order 16 bits of the double word are stored in a portion of an address control unit 82 to allow the CPU 2 to request the previous instruction word at a later time.

The contents of function code register 96 select a firmware word in a control store 60 via control store addressing logic 58. The firmware word is loaded into a control store data register 62 and conditions CIP 10 to receive additional control information from CPU 2. A control store decode logic 61 generates control signals by decoding the output signals RD 00-67+ from control store data register 62. Signals RD 52-67+ applied to control store addressing logic 58 results in control store 60 branching to a specified address location.

The CIP 10 instructions operate on three data types, decimal strings containing binary coded decimal digits, alphanumeric strings containing ASCII characters and binary numbers having 16 or 32 bit precision. Decimal data operands are referenced by the location of the most significant digit and length and may have one or two digits in a byte. Packed decimal operands store two digits per byte and string decimal operands store one digit per byte.

String decimal operands may be unsigned and, assumed positive, may have a leading sign byte placed before the most significant decimal byte, a trailing sign byte placed after the least significant decimal byte or a trailing overpunched sign included with the least significant decimal byte.

Packed decimal operands may be unsigned implying a positive sign or have a trailing sign.

Binary data operands have the most significant binary bit as a sign bit with the binary point assumed to the right of the least significant binary bit using 2's complement notation.

The double words received by CIP 10 from CPU 2 following the instruction word specifying a decimal arithmetic operation indicates the decimal type, string or packed, sign information, the length of the operand and the effective address. This is the address of the byte containing the most significant character (4 or 8 bits/character).

Initially during the processing of a decimal numeric instruction, control store 60 generates signals via control store data register 62 causing the address control unit 82 to send the main memory 4 address of the operand 1 word containing the sign character to C/MMU 12. The operand 1 word containing the sign character is received by common bus data interface 80 and stored in OP1 64 and OP2 66. The sign character is selected by selector 70 for transfer to a sign decode overpunch encode logic 74 where it is decoded into status bits indicating an illegal sign or a negative sign. The control store addressing logic 58 is responsive to the illegal sign status bit and the negative sign status bit. If the sign is legal, then the negative sign status bit is stored in the microprogram status register 94. The operand 2 word containing the sign is processed in a similar manner and stored in OP2 66. Selector 70 transfers the sign character to sign decode overpunch encode logic 74 where it is decoded into the illegal sign or the negative sign and stored in the microprogram status register 94. This allows the CIP 10 to abort the instruction and notify the CPU 2 if an illegal sign was detected.

A decimal add instruction is indicated by an output task function code, $07_{16}$ and the instruction register 96 storing hexadecimal $2C_{16}$. During the execution of the decimal add instruction, operand 1 is added to operand 2 and the result of the addition is stored in the location in main memory 4 that stored operand 2.

The CIP 10 waits for the CPU 2 to send the additional control information required for the CIP 10 to execute the decimal add instruction. The additional control information consists of up to 3 double words describing operand 1 and up to 3 double words describing operand 2. The last double word received from the CPU 2 is an output last data descriptor indicated by a function code of $1F_{16}$.

The first of the 3 double words for each operand contains the effective virtual byte address of the operand which indicates the start of the operand in main memory 4, that is, the leftmost or lowest addressed byte containing some of the operand. The second double word may contain an indirect length. The third double word contains the data descriptor which specifies the data type and the position within the initial word received from main memory 4 of the start of the operand.

The six double words are stored in the address control unit 82.

The output of instruction register 56 addresses a word in control store 60 to start the CIP 10 execution of the decimal add instruction by sending the main memory 4 address for the low order word of operand 1 containing the least significant decimal digits to the C/MMU 12 via bus 18. The first word of operand 1 is read from main memory 4 or from a cache memory (not shown) in C/MMU 12 and transferred to CIP 10 via common bus 16 and stored in OP1 64. Similarly, the low order word of operand 2 is received by CIP 10 and stored in data scratchpad unit 50 and in OP2 66.

The bit of each data descriptor word describing the characteristics of the two operands (ASCII string or packed) and the computed position of the least significant decimal digit in their respective low order words for operands 1 and 2 are stored in OP1A 84 and OP2A 78, respectively. In addition, the length of operands 1 and 2 is stored in descriptor operand length processing logic 88. The OP1A 84 output is applied to a selector 68 and the OP2A 78 output is applied to a selector 70 for selecting the operand 1 and operand 2 decimal digits as they are transferred from OP1 64 and OP2 66 for processing by a decimal/binary ALU 76, one decimal digit at a time. The resulting decimal digit of the addition is transferred from ALU 76 to OP2 66 via an internal bus (BI) 100, replacing the operand 2 decimal digit that contributed to this result. The operations of OP1A 84 and OP2A 78 are described in copending related application patent No. 4,384,340 entitled "A Data Processor Having Apparatus for Controlling the Selection of Decimal Digits of an Operand When Executing Decimal Arithmetic Instructions" and application Seri. No. 220,219 entitled "A Data Processor Using a Read Only Memory for Selecting a Part of a Register Into Which Data Is Written".

OP1A 84 keeps track of the number of decimal digits remaining in OP1 64 from the transfer of the low order word. When the last decimal digit from the low order word is read from OP1 64 to ALU 76, OP1A 84 signals the branching logic in control store addressing logic 58 to address a word in control store 60 which fetches the next word of operand 1 from main memory 4 via C/MMU 12. The address of the next word of operand 1 is sent from address control unit 82 to C/MMU 12 via bus 18.

Similarly, OP2A 78 signals the branching logic in control store addressing logic 58 to enter into a firmware routine to transfer the resulting word of the addition stored in OP2 66 to common bus data interface 80 for transfer to main memory 4 via common bus 16 to C/MMU 12 at the location specified by the address from address control unit 82 over bus 18. A copy of the result is stored in data scratchpad unit 50. A read cycle is initiated to read the next word of operand 2 by sending the next address from address control unit 82 to C/MMU 12 via bus 18.

When the processing of all of the decimal digits from operand 1 or operand 2 is completed, descriptor operand length processing logic 88 controls the filling out of the field of the result in accordance with the remaining decimal digits of the longer operand.

Initially during the multiply instruction execution, the entire multiplicand, operand 2, is transferred from main memory 4 to the data scratchpad unit 50 via common bus data interface 80 and BI bus 100. A multiplier double word of operand 1 is transferred to OP1 64 via common bus data interface 80 and BI bus 100. The least significant multiplier digit is read into a multiply register/counter 52 from OP1 64 via BI bus 100 and is applied to the input address terminals of a multiply programmable read only memory (PROM) 54. Each double word of the multiplicand in turn is transferred to OP1 64 from the data scratchpad 50. Each multiplicand digit in turn is applied to the remaining input address terminals of PROM 54 from OP1 64 via selector 68 to generate the partial product digits. Each partial product digit is applied to ALU 76 via selector 68 where it is added to a corresponding decimal digit stored in OP2 66 and the resultant partial product stored back in OP2 66.

The next multiplier digit is read into multiply register/counter 52 and the output applied to PROM 54. Again each multiplicand digit in turn is applied to PROM 54 and the partial product digits are applied to ALU 76 via selector 68 where they are added to the selected partial product digits stored in OP2 66. Here again, OP2A 78 controls selector 70 to select the partial product digit to be applied to ALU 76. The partial product result from ALU 76 is again stored in OP2 66 via BI bus 100.

When all of the multiplicand digits stored in data scratchpad unit 50 have been applied to the input address terminals of PROM 54 along with the most significant multiplier decimal digit output of multiply register/counter 52, the data scratchpad unit 50 contains the product of the multiplication. This product is written into main memory 4 via OP2 66, common bus data interface 80 and common bus 16.

A decimal division instruction is executed by receiving the dividend and divisor in common bus data interface 80 from C/MMU 12 via common bus 16 for storage in the data scratchpad unit 50. Portions of the divisor are stored in OP1 64 in turn and portions of the dividend/partial remainder are stored in OP2 66 in turn. The CIP 10 executes the decimal divide instruction by a series of successive subtractions and counting the number of successful subtractions in an ALQR register/counter 72. A successful subtraction is one in which the result is a positive number.

The divisor in OP1 64 is applied to ALU 76 through selector 68, a decimal digit at a time, the least significant decimal digit first. The dividend in OP2 66 is applied to ALU 76 through selector 70, a decimal digit at a time. OP2A 78 controls selector 70 to select the decimal digit from OP2 66 that would cause the most significant decimal digits of the divisor in OP1 64 to be aligned with the most significant decimal digit of the dividend for the subtraction operation. A portion of the decimal division instruction operation is described in copending related application U.S. Pat. No. 4,384,341 entitled "A Data Processor Having Carry Apparatus Supporting a Decimal Divide Operation".

The output of ALU 76 is stored in OP2 66 via BI bus 100 and the contents of ALQR 72 are incremented if the result of the subtraction of the high order decimal digits with the divisor is a positive number. The divisor in OP1 64 is again subtracted from the result of the previous subtraction which is stored in OP2 66 and the contents of ALQR 72 again are incremented if the result of the subtraction is positive.

When the result of the subtraction is a negative number, the divisor stored in OP1 64 is then added to OP2 66 and the contents of ALQR 72 containing a quotient digit are transferred to the data scratchpad unit 50. OP2 66 and data scratchpad unit 50 now contain the result of the last successful subtraction in the high order decimal digits and the remaining decimal digits are the original low order decimal digits of the dividend.

The divisor is subtracted from the dividend one digit position to the right of the previous set of subtractions to develop the next quotient digit. The subtraction operation is repeated as described above with ALQR 72 being incremented for each positive result of the subtraction.

The first quotient digit stored in data scratchpad unit 50 is transferred to OP2 66 via BI bus 100. The contents of ALQR 72 containing the second quotient digit is transferred to OP2 66 via selector 68, ALU 76 and internal bus 100 where it is appended to the first quotient digit for storage in the data scratchpad unit 50. The partial dividend is transferred back to OP2 66 from the data scratchpad unit 50.

The shifting of the divisor and subsequent subtraction operations are repeated until after computing a quotient digit with the least significant decimal digit of the divisor aligned with the least significant decimal digit of the dividend. The last quotient decimal digit from ALQR 72 is merged with the rest of the quotient in the data scratchpad unit 50 and the portion of the remainder now stored in OP2 66 is stored into the data scratchpad unit 50 via BI bus 100. The quotient and remainder in data scratchpad unit 50 are then stored in main memory 4.

A CIP indicator register 90 is set by the control signals to indicate the status of CIP 10. Register 90 includes an overflow indicator which is set during decimal operations when the receiving field cannot store all significant digits of the result or a divide by zero is detected. A truncation indicator is set during alphanumeric operations when the receiving field cannot contain all characters of the result. A sign fault indicator is set during decimal operations when a negative result is stored in an unsigned field. A greater-than indicator is set during the execution of certain decimal and alphanumeric instructions when the result is greater than zero for decimal numeric operations or operand 1 is greater than operand 2 for decimal or arithmetic comparisons. A less-than indicator is set during the execution of certain decimal and alphanumeric instructions when the result is less than zero for decimal arithmetic instructions or operand 1 is less than operand 2 for either decimal or alphanumeric comparisons.

A CIP mode register 92 stores an overflow trap mask and a truncation trap mask which are indications of which special action the CIP 10 and CPU 2 should take when the overflow or truncation condition arises.

A system clock logic 86 includes a 160 nanosecond four phase clock that provides clock signals to trigger all CIP 10 registers and all test and control flops, stabilize registers after loading, signify that address, data, control and parity are valid allowing initiation of a local bus cycle. In addition, the system clock logic 86 may be stalled when additional time is required to complete certain CIP 10 functions. The system clock logic 86 generates a BUSY signal over common bus 16 to indicate to CPU 2 that the CIP 10 is not available, receives a DCN signal from the C/MMU 12 bus to signal the CIP 10 that data for the CIP 10 is on the common bus 8, generates a REQUEST for use of the common bus 16, and waits for a GRANT from the C/MMU 12.

The microprogram status register 94 in addition to storing operand sign information also stores an indication if an overflow was detected in executing a decimal numeric instruction, whether an encode or a decode overpunched sign operation is required, and when a decimal add operation is completed.

Referring to FIG. 3, the data scratchpad unit 50 includes a register file D (RFD) 50-1, a register/counter (AA) 50-2, a register/counter (AB) 50-3 and a MUX 50-4. RFD 50-1 includes 8 4-bit random access memories organized to store 16 32-bit double words. RFD 50-1 is addressed from either AA 50-2 via signals RFDAA 0-3+, MUX 50-4 and signals RFDAD 0-3+, or from AB 50-3 via signals RFDAB 0-3+, MUX 50-4 and signals RFDAD 0-3+, RFD 50-1 is coupled to BI bus 100 via signals BIDT 00-31−. AA 50-2 and AB 50-3 are loaded from BI bus 100 via signals BIDT 8-11+. During the decimal multiply operation, AA 50-2 stores the location in RFD 50-1 of the multiplicand words and AB 50-3 stores the location of the partial product words.

The descriptor operand length processing logic 88 includes a counter 1 88-1, a counter 2 88-2 and a counter 3 88-3 coupled to a MUX 88-4 via signals CTR1 0-3+, CTR2 0-3+ and CTR3 0-3+, respectively; and coupled to a MUX 88-5 via signals CTR1 4-7+, CTR2 4-7+, and CTR3 4-7+ respectively. Signals RD 16-19+ are applied to MUX 88-4 and signals RD 20-23+ are applied to MUX 88-5 to provide miscellaneous constants for transfer onto BI bus 100. Output signals CTKT 0-3+ of MUX 88-4 are coupled to their respective signals CTBI 0-3+. Output signals CTKT 4-7+ of MUX 88-5 are coupled to their respective signals CTBI 4-7+. Signals CTBI 0-3+ are coupled through MUX 76-11 to BI bus 100 signals BIDT 0-3+, BIDT 8-11+, BIDT 16-19+ and BIDT 24-27+, respectively. Signals CTBI 4-7+ are coupled through MUX 76-11 to BI bus 100 signals BIDT 4-7+, BIDT 12-15+, BIDT 20-23+ and BIDT 28-31+, respectively. Counter 1 88-1, counter 2 88-2 and counter 3 88-3 are loaded from BI bus 100 via signals BIDT 16-23+. During a portion of the decimal multiply operation, counter 1 88-1 stores the number of decimal digits in operand 1, and counter 2 88-2 stores the number of decimal digits in operand 2. During another portion of the decimal multiply operation, counter 1 88-1 and counter 2 88-2 store the number of multiplicand decimal digits remaining to be applied to multiply PROM 54 for the multiplier digit stored in multiply register (MIER) 52. Counter 3 88-3 may store the number of decimal digits of the multiplier remaining for processing or the effective length of the multiplicand.

The decimal binary ALU 76 includes a 4-bit arithmetic logic unit (ALU1) 76-2 for processing decimal numeric arithmetic operations and a 4-bit arithmetic logic unit (ALU2) 76-3 for processing alphanumeric operations and code conversions such as binary to decimal and decimal to binary. The ALU1 output signals ALUDG 0-3+ are applied to a MUX 76-8, a MUX 76-9 and a decimal correction unit 76-7. Output signals ALXS 60,61+ and ALUDG2− from decimal correction 76-7 are applied to MUX's 76-8 and 76-9. MUX 76-8 output signals CTBI 0-3+ and MUX 76-9 output signals CTBI 4-7+ are applied to MUX 76-11 as previously described. The output signals RFDAD 0-3+ of MUX 50-4 are applied to MUX 76-11. Output signals OP1X 00-31+ from RFD 50-1 and OP1 64 are applied to MUX 76-11 as are the output signals OP2D 00-31+ from OP2 66. The outputs of OP1A 84 and OP2A 78, signals OP1AD 0-2+, OP1TYP+, OP2AD 0-2+ and OP2TYP+, are applied to MUX 76-11 and appear at the MUX 76-11 output as signals BIDT 12-15+. Also applied to MUX 76-11 are signals ALQR+ from ALQR 72 and MIER+ from MIER 52 and appear at the MUX 76-11 output as signal BIDT 28-31+ and BIDT 20-23+.

The output of ALU2 76-3, signals ALUZN 0-3+, is applied to a MUX 76-10. Also, a hexadecimal 3 is applied to MUX 76-10 whose output signals ALZON 0-3+ are applied to MUX 76-11.

A register file C (RFC) 82-1 is coupled to the BI bus 100. Selected signals of BI bus 100, BIDT 00-31+, are stored in positions A,0-23 of RFC 82-1. The logic selecting the input bit positions is not shown since it is not pertinent to the invention. Output signals RFC A,- 0-23+ from RFC 82-1 are applied to MUX 76-11 and appear on BI bus 100 as signals BIDT 7-31+.

A units carry 76-5 and a tens carry 76-6 are coupled to ALU1 76-2 via a MUX 76-4. During the decimal multiply operation, the units carry 76-5 is operative when the multiply PROM 54 generates the units position decimal digit and the tens carry 76-6 is operative when the multiply PROM 54 generates the tens position decimal digit. The carry operation is described in copending related application Ser. No. 219,810 entitled "A Data Processor Having Units Carry and Tens Carry Apparatus Supporting a Decimal Multiply Operation".

During the decimal multiply operation, a double word of the partial product is stored in OP2 66 and a double word of the multiplicand is stored in OP1 64. The OP2 66 output signals OP2D 00-31+ are applied to selector 70. The OP2A 78 output signals OP2AD 0-2+ and OP2TYP+ enable selector 70 to transfer the selected decimal digit to terminal A of ALU1 76-2 via signals AL2DG0+. The OP1A 84 output signals OP1AD 0-2+ and OP1TYP+ enable selector 68 to transfer the selected multiplicand digit, received via signals OP1X 00-31+, to multiply PROM 54 via signals OP1DG 0-3+. The output of multiply PROM 54, signals MULDG 0-3+ is applied to terminal B of ALU1 76-2 as signals AL1DG 0-3+. The sum is transferred back to OP2 66 in the selected partial product digit position via MUX 76-8 or 76-9 and MUX 76-11 via BI bus 100.

A MUX 68-1 transfers the output of ALQR 72, signals ALQR 0-3+, or the output of selecter 68-2, signals OP1DG 0-3+, to terminal B of ALU1 76-2 via signals OP1QD 0-3+ and AL1DG 0−. Typically, an operand 1 decimal digit in OP1 64 or RFD 50-1 and an operand 2 decimal digit in OP2 66 may be combined in ALU1 76-2 or the contents of ALQR 72 may be combined with a selected decimal digit position in OP2 66 during a divide operation.

RFC 82-1 of the address control unit 82 stores the instruction and the data descriptors describing the characteristics of the operands. RFC 82-1 is made up of 6 4-bit random access memories and a portion of a seventh random access memory organized as 16 25-bit words. Certain locations of RFC 82-1 are used as a scratchpad memory to temporarily store the contents of the various register/counters including AA 50-2, AB 50-3, counter 1 88-1, counter 2 88-2 and counter 3 88-3.

The decimal correction 76-7 is active during the arithmetic operation. BCD coded decimal digits are added by first modifying the selected OP2 66 digit in selector 70 by increasing its binary value by 6 (excess 6 code). When the modified OP2 66 digit (appearing as signals AL2DG 0-3+) is added to the unmodified digit selected from OP1 64 by the binary ALU1 76-2, the binary carry out of ALU1 76-2 is equivalent to a decimal carry. If a carry out is asserted, then the output of ALU1 76-2 appearing on signals ALUDG 0-3+ is the correct BCD representation of the sum. If carry out is not asserted, then ALUDG 0-3+ is an excess 6 representation of the sum and the decimal correction logic is activated to reduce this sum by 6 to produce the correct BCD representation.

Referring to FIG. 4, the multiply PROM 54 includes a read only memory (PROM) 54-1 and a negative logic OR gate 54-2 which enables the PROM 54-1 via signal MULENB—. PROM 54-1 has the capacity for storing 512 decimal digits, 256 units position decimal digits and 256 tens position decimal digits.

The multiply register 52 includes a register/counter 52-1, a negative logic OR gate 52-3 and a negative AND gate 52-2. The register/counter 52-1 stores each multiplier digit in turn from the least significant multiplier digit to the most significant multiplier digit. The register/counter 52-1 is also used as a counter by the CIP 10 during the setup of the decimal multiply operation to store a count of the number of multiplicand double words that remain in main memory 4 prior to transfer to the CIP 10. The selector 68 includes the MUX 68-1. The selector 68-2 applies a selected multiplicand digit over signals OP1DG 0-3+ to the 8, 4, 2 and 1 input address terminals of PROM 54-1. The register/counter 52-1 applies the multiplier digit over signal lines MIER 0-3+ to the 128, 64, 32 and 16 input address terminals of PROM 54. The units position of the product appears on output signals MULDG 0-3+ when the PROM 54-1 is enabled by signal MULENB— at logical ZERO and signal MULUNT— at logical ZERO. The tens position of the product appears on the output signals MULDG 0-3+ when PROM 54-1 is enabled and signal MULUNT— is at logical ONE.

The Boolean equation for signal MULUNT— at logical ZERO is:

MULUNT— = [((\overline{RD08}·RD09·RD-10·\overline{RD11})+RD16+\overline{RD17}+\overline{RD18}+RD19)(RD46·\overline{RD47}·\overline{RD48}·\overline{RD49})]

Either the tens multiplication signal MULTNS— or the units multiplication signal MULUNT— at logical ZERO applied to negative logic OR gate 54-2 enables PROM 54-1 by forcing signal MULENB- to logical ZERO.

The Boolean equation for signal MULTNS— at logical ZERO is:

MULTNS— = [((\overline{RD08}·RD09·\overline{RD-10}·\overline{RD11})+RD16+\overline{RD17}+\overline{RD18}+RD19)(RD46·\overline{RD47}·\overline{RD48}·RD49)]

Register/counter 52-1 is operative as a counter when keeping track of the number of double words of the multiplicand remaining in main memory 4 when the CIP 10 is being conditioned to perform the decimal multiply instruction. Register/counter 52-1 is decremented at CLOCK2— time when logic signal DCMIER— is at logical ZERO, forcing the output of NOR gate 52-3, enable signal MIERCT—, to logical ZERO and enabling the —1 terminal.

The Boolean equation for signal DCMIER— at logical ZERO is:

DCMIER— = [(RD08+RD09+RD10+RD11)(\overline{RD16}·\overline{RD17}·RD18·\overline{RD19})]

When register/counter 52-1 is decremented to hexadecimal ZERO, signal MIEREO+ is forced to logical ONE, thereby signalling the control store addressing logic 58 that the transfer of multiplier double words from main memory 4 is concluded after the next transfer.

Register/counter 52-1 is loaded with the number of double words and each multiplier hexadecimal digit in turn from BI bus 100 at CLOCK2— time when signal MIERLD— is at logical ZERO. Signal MIERLD— is applied to the LOAD terminal of register/counter 52-1.

The Boolean equation for signal MIERLD— at logical ZERO is:

MIERLD— = [((RD08·RD09·RD-10·RD11)+RD16+RD17+RD18+RD19)(RD-46·RD47·RD48·RD49)]

A multiplier digit of hexadecimal ZERO forces signal MIEREO+ to logical ONE which signals the control store addressing logic 58 to bring in the next multiplier hexadecimal digit into register/counter 52-1.

MUX 76-1 provides a high impedance for signals OP1QD 0-3+ when the enable signal output of an inverter 54-3, MULENB+, is at logical ONE. The PROM 54-1 is enabled since signal MULENB— is at logical ZERO and output signals MULDG 0-3+ appear on signal lines AL1DG0+. During the loading of register/counter 52-1, the hexadecimal digit is transferred from OP1 64 in FIG. 3, selector 68, MUX 76-1, ALU1 76-2, MUX 76-9, MUX 76-11 and BI bus 100 signals BIDT 20-23+.

Referring to FIG. 4, output signals OP1DG 0-3+ are applied to terminal 1 of MUX 76-1. Output signals OP1QD 0-3+ are applied to terminal B of ALU1 76-2 via signals AL1DG 0-3+. Signal AQRSEL- is at logical ONE and signal MULENB+ is at logical ZERO.

The Boolean equation for AQRSEL— at logical ONE is:

AQR-SEL— = [(RD08+RD09+RD10+RD11)(RD16·RD17·RD18·RD19)]

The ALQR 72 signals ALQR 0-3+ are applied to the terminal 0 of MUX 76-1.

It should be noted that the sequences of operation are controlled by the output signals RD 00-67+ from control store data register 62, FIG. 2. The control signals described by the Boolean equations are output signals from control store decode logic 61. (The Boolean notation [RD08·(\overline{RD09}+RD10)]indicates an output of logical ONE when signal RD08 is at logical ONE and either or both signal RD09 is at logical ZERO or signal RD10 is at logical ONE.)

Register/counter 52-1 is a 74S169 logic circuit and MUX 76-1 is a 74S153 logic circuit described in "The TTL Data Book for Design Engineers", Second Edition, Copyright 1976, and published by Texas Instruments Inc.

PROM 54-1 is a 5624 logic circuit described in the "Intersil Semiconductor Products Catalog" published by Intersil Inc., 10900 N. Tantau Avenue, Cupertino, California and issued March, 1974.

The invention is described by the following example. The multiplicand is 009876543210+ and the multiplier is 78+. The product of the multiplicand and the multiplier is 770370380+.

Referring to FIG. 5, for the example operand 1, the multiplier is stored in word address locations hexadecimal 0502 and 0503 of main memory 4. The two multiplier digits are stored in byte addresses hexadecimal 0A05 and 0A06. The byte address is generated by appending a binary ZERO to the right of the word address for addressing the left hand byte, and appending a binary ONE to the right of the word address for addressing the right hand byte of the word.

Operand 2, the multiplicand, is stored in word locations hexadecimal 850 through 856 or byte locations hexadecimal 10A0 through 10AC of main memory 4. Note that for this example the multiplicand is stored as ASCII numeric characters.

The decimal operation code hexadecimal 0029 is stored in main memory of location hexadecimal 1000. Operand 1, the multiplier, is defined by the data descriptor 1, FIG. 6, hexadecimal E381, stored in location hexadecimal 1001. Data descriptor 1 indicates that operand 1 starts at a main memory 4 location hexadecimal 502 which is generated by adding the contents of CPU 2 register B1 (not shown and assumed to contain hexadecimal 500), to a displacement, hexadecimal 0002, stored in main memory 4 location hexadecimal 1002. Operand 2, the multiplicand, is defined by the data descriptor 2, hexadecimal 6D01, stored in main memory 4 location hexadecimal 1003. Data descriptor 2 indicates that operand 2 starts at location hexadecimal 850 which is generated in CPU 2 by adding the contents of CPU 2 register B1 (not shown) to the displacement, hexadecimal 350, stored in location 1004.

Under CPU 2 control, information derived from the contents of location hexadecimal 1000 through 1004 are transferred to the CIP 10 and stored in RFC 82-1 locations. The function codes are transferred from the CPU 2 and stored in function code register 96, FIG. 2. Function code hexadecimal 07 defines the double word received from main memory 4 as an instruction word, function code 09 as an effective byte address, function code 0F as the data descriptor and function code 1F as the last data descriptor. Note that the base address, hexadecimal 500, from CPU 2 register B1 (not shown) is modified in CPU 2 by the displacement to generate the effective byte address.

Figure 6:
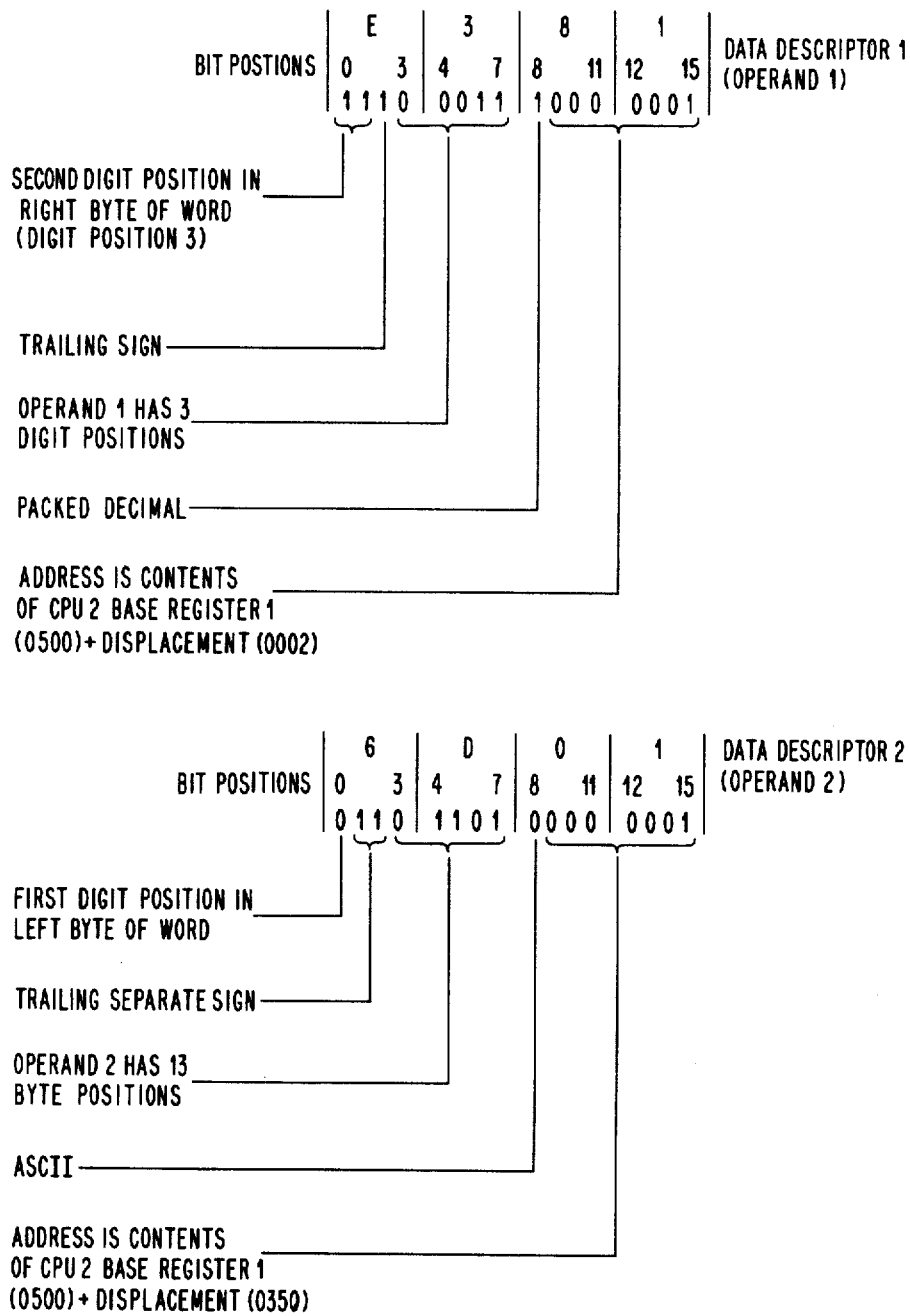
FIG. 6 describes the bit configurations of the data descriptors of the operands of the multiplication example.

Referring to FIG. 6, the data descriptors define the characteristics of the operands. The data descriptor is made up of 16 binary bits usually represented by 4 hexadecimal digits.

For the example, operand 1 was selected as packed decimal, that is, two decimal digits per byte; and operand 2 was selected as string decimal, one ASCII character per byte. Bit position 8 indicates that operand 1 contains packed decimal digits and operand 2 contains ASCII characters.

Each word includes 2 byte positions. Bit positions 0 and 1 of data descriptor 1 identify the location in the word of the first character in operand 1. Here binary bit 0 at binary ONE identifies the first character as being in the right hand byte of the word and binary bit 1 at binary ONE identifies the first character as being in the right hand portion of the byte. Referring to FIG. 5, the hexadecimal digit 7 of operand 1 is in the fourth location of word address hexadecimal 502 (byte address hexadecimal A05).

A binary ZERO in bit position 0 of data descriptor 2 identifies the first character as being in the left hand byte position, byte address location hexadecimal 10A0 of word address location hexadecimal 850.

Bit position 2 at binary ONE of data descriptor 1 and bit positions 1 and 2 at binary ONE of data descriptor 2 identify both operands as having trailing signs.

Bit positions 3 through 7 indicate that operand 1 is 3 4-bit characters long and operand 2 is 13 8-bit characters long.

Bit positions 9 through 15 identify the way CPU 2 will calculate the word address location in main memory 4 which contains the first character. The binary ONE in bit position 15 and binary ZERO's in bit positions 9 through 14 indicate that the CPU 2 will add the displacement from the word following the descriptor (FIG. 5) to the contents of CPU 2 base register 1 (not shown), hexadecimal 500, to indicate that operands 1 and 2 start at word address hexadecimal 502 and 850, respectively.

FIG. 7 shows the functions performed by specific logic blocks controlled by signal RD 00–67+ configurations. FIG. 8 shows the contents of the registers and counters after each of the detailed steps in performing the sample multiplication.

The multiplicand is stored in locations hexadecimal D, E, F and 0 of RFD 50-1 and locations hexadecimal 1 through 8 are cleared to hexadecimal ZERO in preparation for storing the partial products.

Initially, the multiplier double word XXX7 8BXX was received by an INR register (not shown) in common bus data interface 80 and transferred to OP1 64. The multiplier double word also remains in register INR for the decimal multiply operation.

In DML 100, units carry 76-5 and tens carry 76-6 are cleared to binary ZERO. Register/counter AB 50-3 is loaded with hexadecimal 8, the address in RFD 50-1 of the least significant digits of the product. OP2A 78 is loaded with hexadecimal F to point to bit positions 28-31 of OP2 66, the location of the sign character of the product.

In DML 102, OP1A 84 is loaded with hexadecimal C to point to bit positions 16-19 of OP1 64 the location in which digit "8" of the multiplier is stored.

In DML 105, the digit 8 is transferred to register/counter 52-1, FIG. 4, and OP1A 84 is decremented to hexadecimal B to point to the multiplier digit 7 in OP1 64. OP2A is decremented to hexadecimal E, the location of the least significant numeric digit of the product.

In DML 110, the contents of OP1A 84, hexadecimal B, the location of the next multiplier digit, are stored in RFC 82-1; counter 1 88-1 is decremented to hexadecimal 00. If the multiplier digit stored in register/counter 52-1 has been a hexadecimal 0 instead of the 8 assumed in this example, then the logic branches to DML 105 to transfer the next multiplier digit from OP1 64 to register/counter 52-1 and shifts the partial product starting point one digit to the left by decrementing OP2A 78. (Other multiply control words, not shown, read additional double words of the multiplier if OP1A 84 wraps around and decrements AB if OP2A 78 wraps around.)

In DML 200, the contents of AB 50-3, hexadecimal 8, and the contents of OP2A 78, hexadecimal E, are stored temporarily in RFC 82-1 for later retrieval. Counter 3 88-3 is incremented to show the number of multiplier digits remaining for transfer to MIER 52.

In DML 205, AA 50-2 is loaded with hexadecimal F, the address in RFD 50-1 of the least significant double word 33323130 of the multiplicand. OP1A 84 is loaded with hexadecimal 7, which was previously stored in RFC 82-1. Hexadecimal 7 in OP1A 84 points to the least significant byte position in OP1 64, hexadecimal 30.

In DML 210, the contents of location hexadecimal F of RFD 50-1, hexadecimal 33323130, are transferred to OP1 64. AA 50-2 is decremented to hexadecimal E, the address of the next double word of the multiplicand in RFD 50-1.

In DML 220, the contents of address hexadecimal 8 of RFD 50-1, hexadecimal 0000 0000, is transferred to OP2 66 to clear OP2 66.

In DML 225, the count of the number of significant multiplicand digits, hexadecimal 09, is transferred from RFC 82-1 to counter 1 88-1 and counter 2 88-2. The units carry 76-5 and the tens carry 76-6 are cleared.

The development of the partial products are carried out in DML 230 and DML 235. In DML 230, the units partial product digit from PROM 54-1 is added to the digit stored in OP2 66 at the position stored in OP2A 78 and the sum stored back in OP2 66 at that position. If the units carry 76-5 is set, then a binary ONE is added during the ALU1 76-2 add cycle via the carry in signal in FIG. 3. If there is a carry out, then units carry 76-5 is set. OP2A 78 is decremented by 2 to point to the next higher order partial product position in OP2 66.

In DML 235, the tens partial product digit from PROM 54-1 is added to the digit stored in OP2 66 at the position stored in OP2A 78 (one less than in DML 230) and the sum stored back in OP2 66 at that position. If the tens carry 76-6 is set, then a binary ONE is added during the ALU1 76-2 add cycle via the carry in signal in FIG. 3. If a carry results, then the tens carry 76-6 is set. Note that a tens partial product digit is developed followed by a units partial product digit with OP2A 78 pointing to the same OP2 66 digit position.

When in DML 235, decrementing OP1A 84 from binary 0001 to binary (0)111 indicates that the last multiplicand digit in OP1 64 is being processed. After the tens digit is processed in DML 235, counter 1 88-1 is tested. If counter 1 88-1 does not equal hexadecimal 00 indicating that additional multiplicand digits are stored in RFD 50-1 and the last digit in OP1 64 is being processed, then a branch to DML 250 is made to transfer the next double word 37363534 from location hexadecimal E of RFD 50-1 to OP1 64. AA 50-2 is decremented to hexadecimal D, the location of the next higher order double word of the multiplicand. Since the multiplicand is in the string decimal form, OP1A 84 is decremented by 2. Subtracting 2 from binary (0)001 gives binary (0)111 since the OP1TYP bit is not involved in the incrementing or decrementing calculations. If the multiplicand were packed decimal, OP1A 84 would have been decremented by 1. OP1A 84 would contain hexadecimal 8 indicating packed decimal and the high order digit of OP1 64. Subtracting one again would give (1)111 or hexadecimal F. This is described in U.S. Pat. No. 4,384,340 entitled "A Data Processor Having Apparatus for Controlling the Selection of Decimal Digits of an Operand When Executing Decimal Arithmetic Instructions" and application Ser. No. 220,219 entitled "A Data Processor Using a Read Only Memory for Selecting a Part of a Register Into Which Data Is Written".

During DML 230, the contents of OP2A 78 are tested for binary X000 indicating that the partial product which is always in packed decimal form has filled OP2 66. After DML 230 is processed, a branch to DML 240 is made and the partial product hexadecimal 23456800 is transferred to location hexadecimal 8 of RFD 50-1 and AA 50-2 is decremented to hexadecimal 7. In DML 245, the contents of location hexadecimal 7, hexadecimal 00000000, are transferred to OP2 66 and a branch to DML 235 is made to continue the development of the partial product using the multiplier digit 8.

Again when OP1A 84 is decremented from binary 0001, a branch to DML 250 is made and the last double word of the multiplicand hexadecimal 30303938 is transferred from location hexadecimal D of RFD 50-1 to OP1 64. A branch is made to DML 230 to continue the partial product development with multiplier digit 8.

During DML 235, counter 1 88-1 is tested for hexadecimal 00 indicating that all of the multiplicand digits were processed and a branch is made to DML 255 to add the last units carry to OP2 66 if units carry 76-5 was set.

In DML 260, the partial product in OP2 66 is transferred to location hexadecimal 7 of RFD 50-1.

In DML 265, the multiplier double word xxx78Bxx is restored in OP1 64 from the common bus data interface 80 and counter 3 88-3 is decremented to hexadecimal 00 indicating that the last multiplier digit is to be processed.

In DML 270, the contents of counter 3 88-3, hexadecimal 00, are transferred to counter 1 88-1 and a branch to DML 100 is made and the above operation repeated for a multiplier digit 7. (Note that the first partial product digit used is one digit to the left of the one used for the multiplier digit 8.)

Now when DML 255 is processed, the contents of counter 3 88-3 are tested and found to be hexadecimal 00 indicating that the multiplication is completed since all of the multiplier digits were processed.

A branch is made to DML 295 where the partial product stored in OP2 66 is transferred to location hexadecimal 7 and DML 300 is called as a routine to write the product into main memory 4.

The data descriptors define the characteristics of the operands. FIG. 5 includes the data descriptors which define operand, the multiplier and operand 2, and the multiplicand of the decimal multiply instruction. FIG. 6 describes the functions performed by the data descriptor bits.

The data descriptors are received by CIP 10 from main memory and stored in RFC 82-1 in bit positions 8 through 23. The output of RFC 82-1, signals RFC A-23+, is applied to MUX 76-11 and when selected are applied to BI bus 100 signals BIDT 07-31+ of FIG. 3.

Referring to FIG. 9, during the processing of the data descriptors, a DSCR register 88-35 stores a copy of the data descriptor currently being processed. Bit position 8 of the data descriptor and DSCR 88-35 in FIG. 6 identifies the operand as packed decimal if a binary ONE and ASCII if a binary ZERO. The DSCR 88-35 also stores in bit positions 0 and 1 an indication of the position of the high order character within the high order word for a packed decimal operand or the position of the high order byte in the high order word for an ASCII operand.

TABLE 1

| Position of high order character | DSCR | | | |
|---|---|---|---|---|
| | 00+ | 01+ | 08+ | |
| Position 0 of high order word | 0 | 0 | 1 | Packed decimal |
| Position 1 of high order word | 0 | 1 | 1 | Packed decimal |
| Position 2 of high order word | 1 | 0 | 1 | Packed decimal |
| Position 3 of high order word | 1 | 1 | 1 | Packed decimal |
| Left byte | 0 | | 0 | String decimal |

TABLE 1-continued

| Position of high order character | DSCR | | | |
|---|---|---|---|---|
| | 00+ | 01+ | 08+ | |
| Right byte | 1 | | 0 | String decimal |

Table 1 identifies the operand characteristics from the data descriptor bit positions 0, 1 and 8 configuration.

Data descriptor bit positions 3 through 7 store the operand length; that is, the number of characters in the operand including the sign character. This value is transferred to counter 3 88-30 and 88-31 unless value is 0 in which case a value in a CPU 2 register is sent to CIP 10 and is eventually stored in counter 3. Bit positions 3 through 7 are stored in bit positions 11 through 15 of RFC 82-1, transferred to MUX 76-11 via signals RFC 11-15+ and appear on BI bus 100 as signals BIDT 19-23+ for loading into counter 3 88-30 and 88-31.

The output of DSCR 88-35, signals DSCR 00,01 and 08+, and the output of counter 3 88-30 and 88-31, signals CTR3 03-07+, are applied to a digit offset PROM 88-32 and an address displacement PROM 88-33. The contents of PROM's 88-32 and 88-33 are shown in FIGS. 11 and 10, respectively.

DSCR 88-35 is loaded under the control of signal ARFBIC— from control store decode logic 61. A signal LCT4BT— at logical ONE is applied to an AND gate 88-36. The output signal CTRLB3+ is loaded into counter 3 88-31. A signal LCT5BT— at logical ZERO applied to a negative OR gate 88-37 forces output signal LCT45B— to logical ZERO masking out signals BIDT 16-18+ applied to AND gates 88-38, 88-39 and 88-40, respectively. This forces signals CTRLB 0-2+ to logical ZERO, thereby removing the control field (bits 0, 1 and 2) from the length.

FIG. 10 shows the binary bit layout of the PROM 88-33. Signal DSCR 08+ at binary ZERO identifies the operand as string decimal, that is 2 eight bit bytes per word as shown in FIG. 5. Signals CTR3 03-07+ identify the character length of the operand including sign. Signal DSCR 00+ being a binary ZERO indicates an offset of zero (when the high order character is stored in the left byte position of the word). The output signals OPDSP 0-3+ always indicate a value which is one less than the number of double words in main memory 4 in which at least part of the operand is stored. For example, for a string decimal operand of 13 decimal digits with a zero offset, the PROM 88-33 output signals OPDSP 0-3+ indicate a hexadecimal 3 indicating that the operand is stored in main memory 4 in 4 double words. Additionally, the hexadecimal 3 may be combined with the effective address stored in RFC 82-1 to calculate the main memory 4 address of the least significant word or double word of the operand. (The CIP 10 may request via the C/MMU 12 the transfer to the CIP 10 of any word (SINGLE READ) or a double word starting at any word boundary (DOUBLE READ).)

If the offset of the string decimal operand is one as indicated by signal DSCR 00+ being a binary ONE, that is, the high order character is in the right byte position of the word, then the signals CTR3 03-05+ equal the output signals OPDSP 1-3+. For a length of 13 characters as indicated by signals CTR3 03-07+, the binary configuration is $\overline{01101}$, making the output signals OPDSP 0-3+ a hexadecimal 3 (0011). (This would be the case if the second operand in FIG. 5 was shifted right one byte.)

A packed decimal operand is identified by signal DSCR 08+ at binary ONE. Here the offset is indicated by signals DSCR 00+ and DSCR 01+. A packed decimal operand of length 16 is stored in 2 double words in main memory 4 for an offset of zero, therefore signals OPDSP 0-3+ are at hexadecimal 1 and is stored in 3 double words for an offset of one to three, in which case signals OPDSP 0-3+ are at hexadecimal 2.

FIG. 11 shows the layout of PROM 88-32. The PROM 88-32 stores signals which indirectly control the reading of single words and double words from main memory 4. During such instructions as alphanumeric compare and alphanumeric move, the operand is read from memory high order word first. Depending upon the operand length, data type and descriptor offset, the first read cycle from main memory 4 will call for a single word or a double word, then subsequently if necessary double words. The PROM 88-32 output signals OPOFF 0-2+ are stored in OP1A 84 and/or OP2A 78. Signal OPOFF 0+ is applied via OP1A 84 or OP2A 78 signal OP1AD 0+ or OP2AD 0+, respectively, to control store addressing logic 58 to choose between control words which initiate a one or two word read from main memory 4. The signals OPOFF 0-2+ point to the most significant character of the operand for a left-to-right read from main memory 4 or the least significant character of the operand for a right-to-left read. In some instructions, the signals OPOFF 0-2+ may point to the sign positions of the operands to enable an examination of the sign characters.

The PROM 88-33 stores signals which indicate one double word less than the number of double words in the operand (multiplier in the case of a decimal multiply instruction). These signals are also used by the RFC 82-1 to compute the address in main memory 4 of the least significant word or double word in the operand. PROM 88-33 output signals OPDSP 0-3+ are applied to MUX 76-11 and appear as BI bus 100 signals BIDT 20-23+ for storage in MIER 52 and may also appear as signals BIDT 26-29+ with signals BIDT 24 25, 30, and 31 at binary ZERO for modifying the operand effective byte addresses in RFC 82-1 which identifies the main memory 4 byte containing the most significant character. The signals BIDT 24-31+ are added to the effective byte address to generate the optimal main memory 4 address location that may be used to read the least significant decimal digit of the operand.

Signal DIROFF— at logical ZERO applied to an input address 128 causes signals OPOFF 0-2+ to indicate the position in OP1 64 or OP2 66 of the high order byte in a string operand or the high order digit in a packed decimal operand without considering operand length (the high order character will be in the left half of OP1 64 or OP2 66).

As an example from PROM 88-32, FIG. 11, signals DIROFF—, LTROFF—, DSCR08+ and DSCR00+ at binary 0100, respectively, indicate a string decimal operand with an offset of ZERO. The output signals OPOFF 0-2+ at binary 001 applied to OP1A 84 or OP2A 78 select the left byte of the high order word stored in OP1 64 or OP2 66, respectively (a hardware requirement is that OP1A 84 or OP2A 78 select the odd numbered digit of a byte).

Signals DIROFF—, LTROFF—, DSCR 08+, DSCR 00+ and DSCR 01+ at binary 01110, respectively, indicate a packed decimal operand with an offset of 2. The output signals OPOFF 0-2+ at binary 010 indicate that the selected digit is in digit positon 2 or the third digit position of the four digit positions in the high order word stored in OP1 64 or OP2 66.

Signal DIROFF— at logical ONE and signal LTROFF— at logical ZERO indicate that operand words are received from main memory 4 high order word first (left-to-right). Signal DIROFF— at logical ONE and signal LTROFF— at logical ONE indicate a right-to-left transfer from main memory 4.

As an example, assume signals DIROFF—, LTROFF—, DSCR 08+, DSCR 00+, DSCR 01+, CTR3 05+, CTR3 06+, and CTR3 07+ are binary 10110111, respectively, indicating a left-to-right transfer, a packed decimal operand and an offset of 2 for lengths 7, 15, 23 or 31 (Length mod 8=7). Signals OPOFF 0-2+ at binary 110 indicate that OP1A 84 or OP2A 78 will point to digit position 6 or words 7, 15, 23 or 31. Digit position 6 is in the right hand word position of a double word. Signal OPOFF 0+ at logical ONE also indicates that the first transfer from main memory 4 is a single word transfer.

Assume signals DIROFF—, LTROFF—, DSCR 08+, DSCR 00+, CTR3 06+ and CTR3 07+ are binary 110110 indicating a right-to-left transfer, a string decimal operand, an offset of ONE for the operand lengths 2, 6, 10, 14, 18, 22, 26 and 30 (mod 4=2), then signals OPOFF 0-2+ are at binary 101 indicating the selection of the left byte of the right word. Signal OPOFF 0+ at logical ONE indicates that the first transfer is a double word transfer from main memory 4.

The selection of the first read from main memory 4 as a single or double word enables the OP1A 84 and OP2A 78 pointers to be incremented (or decremented) in a continuous fashion as subsequent characters are processed and subsequent double words are received from main memory 4.

A PROM 88-34 generates signal CTRINC+ to increment, signal CTR3LD— to load, and signal CTR3EN— to enable counter 3 88-30 and 88-31. Also, the carry signal CTR3CP— together with signal CTR30P— enables counter 3 88-31. The PROM 88-34 locations are selected by signals RD 29-33+ from control store data register 62.

The Boolean equations for the following signals from control store decode logic 61 are:

LCT4BT— = [RD08·RD09·RD10·RD11·RD16·RD-17·RD18·RD19]

LCT5BT— = [RD08·RD09·RD10·RD11·RD16·RD-17·RD18·RD19]

LTROFF— = [RD08·RD09·RD10·RD11·RD-20·RD21·RD22·RD23]

ARFBIC— = [RD08·RD09·RD10·RD11·RD20·RD-21·RD22·RD23]

PROM's 88-32 and 88-33 are 5624 memory circuits described in the "Intersil Semiconductor Products Catalog" published by Intersil Inc., 10900 N. Tantau Avenue, Cupertino, California and issued March, 1974.

PROM 88-34 is a 5610 memory circuit also described in the above "Intersil Semiconductor Products Catalog".

Counter 3 88-30 and 88-31 are 74S169 circuits described in the aforementioned "TTL Data Book for Design Engineers".

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A commercial instruction processor (CIP) for executing decimal alphanumeric instructions on operands stored in a memory, said operands being made up of a plurality of words, each of said plurality of words having a plurality of characters in a plurality of character positions, said CIP including apparatus for receiving data descriptor information describing the characteristics of said operands and decimal alphanumeric instruction information from said memory, and generating a plurality of signals for aligning said operands comprising:

register means coupled to said memory for storing data descriptor signals received from said memory and representative of a length of one of said operands, indicative of said one operand being in a predetermined form, and indicative of a position of a predetermined starting character of said one operand when stored in said memory;

control store means coupled to said memory and responsive to said instruction information for generating instruction direction signals indicative of whether the character positions of said operands would be processed in a left-to-right or a right-to-left direction by said CIP;

read only memory means coupled to said register means and said control store means and responsive to said data descriptor length signals, said data descriptor predetermined form signal, said data descriptor position signals, and said instruction direction signals, all of which are applied to a plurality of address terminals of said read only memory means for generating said plurality of aligning signals representative of bits stored in an address location identified by the signals applied to said plurality of address terminals;

first means coupled to said read only memory means and responsive to a first plurality of said aligning signals for generating signals, indicative of the number of read cycles needed to transfer a predetermined number of words of said plurality of words of said one operand from said memory; and second means coupled to said read only memory means and responsive to a second plurality of said aligning signals for generating signals for indicating said predetermined starting character position.

2. The apparatus of claim 1 wherein said register means comprises:

a first register for storing a first descriptor signal in a first state for indicating that said one operand in said predetermined form is a packed decimal operand, and said first descriptor signal in a second state indicating that said one operand in said predetermined form is a string operand.

3. The apparatus of claim 2 wherein said first register further stores a second descriptor signal in a first state for indicating a first position of said predetermined starting character, and said second descriptor signal in a second state for indicating a second position of said predetermined starting character in said string operand.

4. The apparatus of claim 3 wherein said first register further stores a third descriptor signal which with said second descriptor signal indicates a first binary count of said position of said predetermined starting character in said packed decimal operand.

5. The apparatus of claim 4 wherein said register means further comprises:
a second register for storing a plurality of descriptor signals for indicating a second binary count representative of said length of said operand.

6. The apparatus of claim 5 wherein said control store means comprises:
decode means for generating a first and a second instruction direction signal.

7. The apparatus of claim 6 wherein said read only means comprises:
a first read only memory, responsive to said plurality of descriptor signals and said first, second and third descriptor signals for generating said first plurality of said aligning signals.

8. The apparatus of claim 7 wherein said read only memory means further comprises:
a second read only memory responsive to selected ones of said plurality of descriptor signals, said first, second and third descriptor signals and said first instruction direction signal in a second state for generating said second plurality of said aligning signals.

9. The apparatus of claim 8 wherein said second read only memory is further responsive to said first instruction direction signal in a first state and said second instruction direction signal in a first state for generating said second plurality of said aligning signals for indicating said predetermined character position in said low order word, a first signal of said second plurality of said aligning signals in a first state calls for said low order word to be transferred from said memory during a two word transfer read cycle, and said first signal in a second state calls for said low order word to be transferred from said memory during a one word transfer read cycle.

10. The apparatus of claim 9 wherein said second read only memory is further responsive to said first instruction direction signal in said first state and said second instruction direction signal in a second state for generating said second plurality of said aligning signals for indicating said predetermined character position in said high order word, said first signal in said second state calls for said high order word to be transferred from memory during said two word transfer read cycle, and said first signal in said first state calls for said high order word to be transferred from said memory during said one word transfer read cycle.

* * * * *